United States Patent
Ebuchi et al.

(10) Patent No.: US 7,909,123 B2
(45) Date of Patent: Mar. 22, 2011

(54) CONTROL APPARATUS FOR HYBRID DRIVING APPARATUS

(75) Inventors: Hiroaki Ebuchi, Susono (JP); Motoji Hirata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 134 days.

(21) Appl. No.: 12/342,822

(22) Filed: Dec. 23, 2008

(65) Prior Publication Data

US 2009/0159349 A1 Jun. 25, 2009

(30) Foreign Application Priority Data

Dec. 25, 2007 (JP) ................ 2007-333103

(51) Int. Cl.
*B60W 20/00* (2006.01)
(52) U.S. Cl. ......... 180/65.235; 180/65.265; 180/65.275; 180/65.285
(58) Field of Classification Search ............ 180/65.235, 180/65.265, 65.275, 65.285, 65.21; 477/3, 477/4, 5; 701/51
See application file for complete search history.

(56) References Cited

U.S. PATENT DOCUMENTS

| 6,579,201 B2 * | 6/2003 | Bowen ............................. 475/5 |
| 7,252,619 B2 * | 8/2007 | Tabata et al. ..................... 477/3 |

FOREIGN PATENT DOCUMENTS

| JP | 2004-345527 | 12/2004 |
| JP | 2005-278387 | 10/2005 |
| JP | 2006-46578 | 2/2006 |
| JP | 2007-1451 | 1/2007 |
| JP | 2007-69842 | 3/2007 |

* cited by examiner

*Primary Examiner* — J. Allen Shriver, II
*Assistant Examiner* — Katy Meyer
(74) *Attorney, Agent, or Firm* — Oblon, Spivak, McClelland, Maier & Neustadt, L.L.P.

(57) ABSTRACT

In a hybrid vehicle, an ECU performs speed-change control and selectively changes a speed-change mode between a stepless speed-change mode and a fixed speed-change mode in accordance with the travel condition of the hybrid vehicle. At this time, in the condition that the fixed speed-change mode is selected, if an accelerator off operation is performed, a release preparing process is performed, and a reaction element which receives the reaction torque of engine torque in a power dividing mechanism is changed to a sun gear on a motor generator side. Moreover, if an accelerator off speed or a brake pedal operation amount exceeds its own reference value, the speed-change mode is transferred into the stepless speed-change mode, predictively and unconditionally, before a normal speed-change condition is met.

6 Claims, 8 Drawing Sheets

CONTROL APPARATUS FOR HYBRID DRIVING APPARATUS

BACKGROUND OF THE INVENTION

1. Field of the Invention

The present invention relates to a control apparatus for a hybrid driving apparatus, which is equipped with an internal combustion and an electric motor as the power source of a vehicle.

2. Description of Related Art

As this type of driving apparatus for a hybrid vehicle, the following apparatus has been suggested: a driving apparatus provided with a brake, in which a power source, an output member, and a first motor generator are connected to a power transfer mechanism, provided with a plurality of pairs of differential mechanisms, and in which the rotation of any of the rotational elements of the power transfer mechanism is stopped, to thereby fix a ratio of the number of rotations between the power source and the output member in an overdrive state (e.g. refer to Japanese Patent Application Publication Laying Open No. 2004-345527). According to the driving apparatus for the hybrid vehicle disclosed in Japanese Patent Application Publication Laying Open No. 2004-345527 (hereinafter referred to as a "conventional technology"), the hybrid driving apparatus is constructed such that the plurality of differential mechanisms do not contribute to torque transmission among the power source, the first motor generator, and the output member, in the condition that the ratio of the number of rotations is continuously controlled. Thus, it is considered that the power transmission efficiency of the entire apparatus can be improved and that a power loss can be limited or controlled.

SUMMARY OF THE INVENTION

If an internal combustion is used as the power source, the combustion rotational speed of the internal combustion is uniquely determined in accordance with the travel state of the hybrid vehicle in the overdrive state. Therefore, for example, in circumstances that a driver may perform a sudden braking operation, such as avoiding a vehicle ahead or an obstacle ahead, there can be such problems that the combustion rotational speed is rapidly reduced and that the power performance of the hybrid vehicle is reduced. In particular, if the combustion rotational speed falls below a self-rotatable rotational speed or in similar cases, the internal combustion cannot keep the self-rotational state, and not only the reduction in power performance but also a reduction in comfortable performance are likely actualized, such as an increase in knocking and engine stall (or engine failure). In other words, the conventional technology has such a technical problem that the power performance or comfortable performance of the hybrid vehicle is likely reduced in the sudden braking.

It is therefore an object of the present invention to provide such a control apparatus for a hybrid driving apparatus that can prevent a reduction in power performance and comfortable performance of a vehicle.

The above object of the present invention can be achieved by a control apparatus for a hybrid driving apparatus installed in a vehicle, the control apparatus provided with: an internal combustion; a first electric motor; an engaging device provided with first and second engagement elements which can engage with each other; a power dividing device provided with a plurality of rotational elements including a first rotational element connected to an output shaft of the internal combustion, a second rotational element connected to an output shaft of the first electric motor, a third rotational element connected to a driving shaft of the vehicle, and a fourth rotational element connected to the first engagement element, the rotational elements being adapted to mutually perform differential rotation; and a second electric motor whose output shaft is connected to the third rotational element, the first electric motor capable of controlling rotational speeds of the first and fourth rotational elements, a stepless speed-change mode being realized which can continuously change a rotational speed ratio between the driving shaft and the output shaft of the internal combustion as a speed-change mode of the vehicle by that the second rotational element has reaction torque of output torque of the internal combustion if the engaging device is in a release state in which the first engagement element is released from the second engagement element, a fixed speed-change mode being realized which fixes the rotational speed ratio to a predetermined value as the speed-change mode by that the fourth rotational element has the reaction torque if the engaging device is in an engagement state in which the first engagement element engages with the second engagement element, the control apparatus further provided with: a specifying device for specifying extent of a predetermined type of decelerating operation which indicates that the vehicle is decelerated; and a controlling device for performing predetermined release preparing control including that the first electric motor is controlled such that the specified extent correspond to magnitude of the reaction torque applied to the second rotational element, respectively.

The hybrid driving apparatus of the present invention is an apparatus (which may be referred to in various manners, such as a system, a mechanism, or a unit) adapted to transmit a driving force in a form of torque or the like. The driving force is outputted from the internal combustion, the first electric motor such as a motor or a motor generator, and the second electric motor such as a motor or a motor generator, to the driving shaft of the vehicle in the present invention, as occasion demands. The driving shaft of the vehicle in the present invention can conceptually adopt the following form: an axle, which can adopt a form such as a drive shaft or an axle shaft, directly or indirectly connected to drive wheels, as a preferred form; or a rotational shaft, which is connected to the axle through a differential gear apparatus (which may be referred to in various manners, such as a gear system, a gear mechanism, or a gear unit) or various decelerating apparatuses (which may be referred to in various manners, such as a deceleration system, a deceleration mechanism, or a deceleration unit), as occasion demands, and which can rotate in association with the axle. In other words, the vehicle of the present invention, driven by the hybrid driving apparatus of the present invention, is a so-called hybrid vehicle.

In the hybrid driving apparatus of the present invention, the distribution of the driving force among the plurality of driving force sources is determined in accordance with the structure, e.g. the physical, mechanical, mechanistic, or electrical structure of the power driving device. Here, the power dividing device is provided with the first to fourth rotational elements, which are adapted to perform at least mutual differential rotation, and the power dividing device can adopt a form of a complex planetary gear (which may be referred to in various manners, such as a gear apparatus, a gear mechanism, a gear system, or a gear unit) or the like, as a preferred form. In addition, the "complex planetary gear" described here includes a plurality of planetary gears, each of which is provided with a sun gear, a carrier, and a ring gear, as the rotational elements, and it includes such a planetary gear (i.e. complex planetary gear) in which arbitrary elements or one part of rotational elements in each planetary gear are directly or indirectly connected to make an integral rotational element (or rotational element which can be treated as one body).

The hybrid driving apparatus of the present invention is provided with the engaging device, which can conceptually adopt the following form: a hydraulically-controlled engaging apparatus, including a hydraulic brake or various hydraulic clutches, such as an engaging type clutch like a dog clutch, and a wet multiplate clutch; an electromagnetically-controlled friction engaging apparatus, such as an electromagnetic clutch; or a mechanical friction engaging apparatus, such as a hand brake. The engaging device is provided with the first and second engagement elements which can engage with each other. The engaging device can include various driving apparatuses which can drive at least one of the engagement elements so that the engagement elements engage with each other, various detecting devices for detecting the physical states of the engagement elements, and the like, as occasion demands. At this time, the second engagement element is fixed, physically, mechanically, mechanistically, or electrically, or directly or indirectly, as a preferred form. Alternatively, as opposed to these, the second engagement element can hold, grip, or sandwich (also included in the concept of engagement) the first engagement element and can stop the rotation of the first engagement element at least in the state that the second engagement element engages with the first engagement element, regardless of how many elements constitute the second engagement element.

Here, in the hybrid driving apparatus of the present invention, if the engaging device adopts the release state, which is defined as the state that the first engagement element is released from the second engagement element (i.e. the state that the engagement elements are discrete from each other and that the rotation of the second engagement element is not stopped at least by the first engagement element), the stepless speed-change mode is realized as the speed-change mode of the vehicle in which the second rotational element (i.e. uniquely regarded as the first electric motor) is the reaction element and receives the reaction torque of the output torque of the internal combustion (i.e. engine torque), to thereby change the rotational speed ratio (i.e. speed-change ratio) between the driving shaft and the output shaft of the internal combustion such as a crankshaft, strictly, substantially, or continuously within a range defined physically, mechanically, mechanistically, or electrically in advance (including a stepwise aspect similar to being continuous in practice). At this time, by virtue of the rotational speed control of the first electric motor having a function as the rotational speed control mechanism, which can control the rotational speed of the first rotational element connected to the output shaft of the internal combustion and the rotational speed of the fourth rotational element connected to the first engagement element, for example, the operating point of the internal combustion (or one operation condition defined by the output torque and the combustion rotational speed (i.e. the rotational speed of the output shaft)) is arbitrarily selected, theoretically, substantially, or within some restriction, and the operating point of the internal combustion is controlled to an optimum fuel consumption operating point or the like at which a fuel consumption rate can be realistically minimal (maximal in terms of travel distance per unit fuel amount), theoretically, substantially, or within some restriction.

On the other hand, if the engaging device is in the engagement state in which the first and second engagement elements engage with each other, the rotation of the first engagement element (uniquely regarded as the fourth rotational element of the power dividing device) is stopped, as described above. In this case, the aforementioned speed-change ratio is fixed to one value in which a so-called overdrive speed-change ratio can be adopted as a preferred aspect (or fixed speed-change ratio) at which the combustion rotational speed is less than the rotational speed of the driving shaft. Thus the fixed speed-change mode is realized. At this time, the rotational speeds of the single or plurality of first rotational elements, which are directly or indirectly connected to the output shaft of the internal combustion capable of functioning as the input member of the power dividing device, are uniquely defined by the rotational speed of the third rotational element, which is directly or indirectly connected to the driving shaft of the vehicle and which rotates in balance with a road load, and by the fourth rotational element whose rotational speed is zero or can be regarded as zero, physically or substantially, as a preferred form.

If the fixed speed-change mode is selected and run as the speed-change mode, the fourth rotational element of the power dividing device can function as the reaction element to which the reaction torque of the engine torque is applied, because the rotation of the fourth rotational element is stopped by a physical, mechanical, mechanistic, electrical, or magnetic force generated by the engaging device. At this time, if the aforementioned stepless speed-change mode is selected and run, the vehicle can travel even if one portion of the reaction torque is applied to the second rotational element in the fixed speed-change mode, in view of the fact that the second rotational element (uniquely regarded as the first electric motor) functions as the reaction element (i.e. the first electric motor functions as the reaction element, to thereby function as the so-called rotational speed control mechanism); however, the fourth rotational element is set to the reaction element in the fixed speed-change mode because it is no longer necessary to supply the driving force corresponding to the reaction torque from the first electric motor if the fourth rotational element is the reaction element, and also because the use efficiency of an energy resource (preferably, electricity) is improved in the entire hybrid driving apparatus. Thus, if the speed-change mode is changed in the hybrid driving apparatus of the present invention, it is necessary to change the reaction element between the second rotational element (i.e. uniquely regarded as the first electric motor) and the fourth rotational element (i.e. uniquely regarded as the first engagement element).

Here, if the fixed speed-change mode is selected as the speed-change mode, the combustion rotational speed of the internal combustion is uniquely determined in accordance with at least the vehicle speed, with or without some physical, mechanical, mechanistic, or electrical speed-changing apparatus or decelerating apparatus being provided between the driving shaft and the driving wheels. Therefore, on theoretical grounds, the vehicle which installs this type of hybrid driving apparatus has a possibility that the combustion rotational speed of the internal combustion is reduced to less than a self-sustaining rotational speed as a self-rotatable rotational speed, or a stable rotational speed (i.e. a value in a higher rotation area than that of the self-sustaining rotational speed) as a stably-rotatable speed, depending on the vehicle speed. In view of such circumstances, a speed-change condition for defining whether or not to change the speed-change mode of this type (or availability of execution) is determined in accordance with the vehicle speed, load conditions, or the like in the following manner: such that the combustion rotational speed of the internal combustion in the fixed speed-change mode is included in a rotation area in which it is greater than or equal to a self-sustaining rotational speed, a target rotational speed or stable rotational speed, which are obtained by adding a constant or inconstant margin to the self-sustaining rotational speed, on the basis of an experimental, experiential, theoretical, or simulation basis in advance; or such that the combustion rotational speed of the internal combustion in the fixed speed-change mode is included in a rotation area in which it is greater than or equal to the self-sustaining rotational speed, which is determined in accordance in the physical, mechanical, mechanistic, or electrical structure of the internal combustion in advance, or the target rotational speed or stable rotational speed, which are obtained by adding a constant or inconstant margin to the self-sustaining rotational speed. For example, the fixed speed-change mode may be selected in a so-called high-speed light-load area defined on the basis of the vehicle speed, the request load of the internal combustion, or the like. The judgment criteria of whether or not to be high-speed and whether or not to be light-load can be determined, as occasion demands, in accordance with the specification, treatment, requested performance of the vehicle or the internal combustion, or the physical, mechanical, mechanistic, or electrical structure or the like of the power dividing device. If the fixed speed-change mode is selected in the high-speed light-load area as described above, the fixed speed-change ratio is preferably the overdrive speed-change ratio.

Here, in particular, for example, a driver sometimes performs a sudden braking operation in the sense that its operation amount or operation speed or the like is greater than that of the normally performed braking operation in some degree, or in similar senses, for the purpose of avoiding a collision with a vehicle ahead or an obstacle ahead, or for other purposes, i.e. regardless of reasons. At this time, the vehicle speed is rapidly reduced in accordance with the operation amount, operation speed, or the like. Therefore, if this type of sudden braking operation is performed in the situation that the fixed speed-change mode is selected, a request is possibly made to change the speed-change mode from the fixed speed-change mode to the stepless speed-change mode, transiently, instantly, or rapidly, according to circumstances, apart from the high or low possibility of such a situation.

However, in order to control the engaging device to be in the release state, it is necessary to change the reaction element, as described above, whether this is an essential process or not, caused by the physical, mechanical, mechanistic, electrical, or magnetic structure of the engaging device. In other words, in order to make the vehicle travel under the control aspect of the stepless speed-change mode without any trouble to the extent that the can be actualized at least in practice, it is necessary to change the reaction element to the second rotational element and to make the first electric motor shoulder the reaction torque, regardless of the structure of the engaging device: a structure in which the engagement element is hardly released (substantially nearly impossible) in the state that a certain degree of engagement force acts between the engagement elements such as a dog clutch (i.e. in the state that the engaging device functions as a certain degree of reaction element), or a structure in which the engagement element can be released theoretically without changing the reaction element because a friction force for defining the engagement force can be controlled in a binary, stepwise, or continuous manner, regardless of the control accuracy, such as a wet multiplate friction clutch, or for similar reasons. In other words, if the first engagement element is released from the second engagement element before the reaction element is changed (of course, if such an operation is practically possible, theoretically, substantially, or within some restriction), the reaction element no longer exists even for a moment, and the internal combustion simply idles, so that hybrid driving apparatus cannot output any driving force to the driving shaft.

Therefore, regardless of the structure of the engaging device, in changing from the fixed speed-change mode to the stepless speed-change mode, there is a possibility of reaching to a low rotation area in which the combustion rotational speed is less than the self-sustaining rotational speed, before the first engagement element is released from the second engagement element. In this case, the reduction in power performance or comfortable performance is possibly actualized, as there is knocking, physical vibration, or impact, or as the internal combustion goes into a combustion stop state (i.e. in a so-called engine stall state).

Thus, in the control apparatus for the hybrid driving apparatus of the present invention, the reduction in power performance and comfortable performance in the vehicle is prevented as follows. According to the control apparatus for the hybrid driving apparatus of the present invention, in its operation, the extent of the decelerating operation, which indicates that the vehicle is decelerated and which is performed, for example, by a driver, is specified by the specifying device which can adopt a form of various computer systems such as microcomputer apparatuses, various controllers, various processing units, such as an ECU (Electronic Control Unit).

Incidentally, "to specify" of the present invention broadly includes to detect a specification target, directly or indirectly, as a physical numerical value or an electric signal or the like corresponding to the physical numerical value, through some detecting device; to select a corresponding numerical value from a map or the like, stored in an appropriate memory device in advance, on the basis of the physical numerical value having a correspondence relationship with the specification target, detected directly or indirectly in the form of electric signal or the like, through some detecting device; to derive in accordance with an algorithm or calculation formula set in advance, from the physical numerical value or the selected numerical value or the like; and to obtain the numerical value or the like, detected, selected, or derived as described above, simply in the form of electric signal or the like. The specifying device of the present invention may have various types of operation aspects.

Here, the "decelerating operation which indicates that the vehicle is decelerated" includes not only the braking operation as the operations of various operating devices directly corresponding to the operation states of various braking devices provided for the vehicle, such as a brake pedal, but also the operations of other various physical, mechanical, mechanistic, or electrical devices, such as the operation of an accelerator pedal, which can judge that this type of braking operation can be performed continuously on a time axis or closely enough to be regarded as being continuously, and the "decelerating operation which indicates that the vehicle is decelerated" conceptually includes operations associated at least with the deceleration of the vehicle. In addition, the decelerating operation realized by the accelerator pedal preferably includes a releasing operation of changing the accelerator opening degree to the throttling side, an operation of reducing a pressing amount, an operation of easing up on the accelerator pedal, an operation of releasing one's foot from the accelerator pedal, and the like. The "extent" of the decelerating operation is a quantitative concept which corresponds to the decelerating operation directly or indirectly and in a one-to-one, one-to-many, many-to-one, or many-to-many manner and which can be denoted as some index value. The extent indicates, for example, the operation amount, the operation speed as the operation amount per unit time, a force served for the operations of various operating devices (e.g. a tread force in case of a pedal), or the like, as a preferred form.

On the other hand, according to the control apparatus for the hybrid driving apparatus of the present invention, in its operation, the release preparing control is performed, as occasion demands, in the condition that the fixed speed-change mode is selected as the speed-change mode, by the controlling device which can adopt a form of various computer systems such as microcomputer apparatuses, various controllers, various processing units, such as an ECU.

The release preparing control in the present invention is such control over the first electric motor that the specified extent of the decelerating operation correspond to the magnitude of the reaction torque applied to the second rotational element, respectively, in a binary, stepwise, or continuous manner. The magnitude of the reaction torque applied to the second rotational element correspond to the magnitude of the output torque of the first electric motor, so that the release preparing control is, in other words, such control that outputs the output torque corresponding to the specified extent of the decelerating operation in a binary, stepwise, or continuous manner from the first electric motor. As a result of the release preparing control performed, if the extent of the decelerating operation is large (a criterion for defining whether or not it is large can be set, appropriately), the reaction torque applied to the second rotational element (i.e. uniquely regarded as the first electric motor) is increased.

In order to change the fixed speed-change mode to the stepless speed-change mode without stopping the supply of the driving force to the driving wheels, it is necessary to change the reaction element, as described above. On the other hand, the aforementioned problem of the reduction in power performance or comfortable performance, which can be caused by that the first engagement element is not released from the second engagement element, preferably occurs in accordance with the vehicle speed, and of course, it correlates with the extent of the decelerating operation as the aforementioned concept. It is, however, not necessarily influenced only by the extent of the decelerating operation. For example, easing up on the accelerator pedal does not necessarily lead to the sudden reduction in the vehicle speed. Moreover, there is a significant delay time until the vehicle speed is reduced to the extent that the aforementioned problem occurs, by easing up on the accelerator pedal or pressing the brake pedal. Therefore, the timing that the extent of the decelerating operation becomes large enough to perform the release preparing control in a binary, stepwise, or continuous manner is earlier than, and is the same or substantially the same as in some cases, but at least is never delayed from the following timing, to the extent that at least one portion of the reaction torque is transferred to the second rotational element by the release preparing control, as a preferred form; namely, the timing of the reduction in the vehicle speed, which may cause the aforementioned problem related to the power performance or comfortable performance; and the normal change timing from the fixed speed-change mode to the stepless speed-change mode.

As a result, the release preparing control in the present invention enables the output torque to be increased in some degree on the first electric motor in which the output torque is zero as a preferred form before the aforementioned problem occurs, by which one portion of the reaction torque can be applied to the second rotational element. Thus, when actually there is a need to release the first engagement element from the second engagement element, it is possible to reduce the time required to transfer the engaging device from the engagement state to the release state, in some degree, compared to at least the case where this type of release preparing control is not performed. In other words, according to the control apparatus for the hybrid driving apparatus of the present invention, it is possible to prevent the reduction in power performance and comfortable performance of the vehicle, caused by the excessive deceleration of the vehicle without the fixed speed-change mode being released, or the like. In addition, the release preparing control in the present invention is such control that at least one portion of the reaction torque is applied to the second engagement element, and it does not essentially need the control that releases the first engagement element from the second engagement element. Therefore, even if the extent of the decelerating operation in the present invention frequently changes due to drivers' characteristics or driving skill or the like, the speed-change mode is not frequently changed between the fixed speed-change mode and the stepless speed-change mode, and it is possible to keep the consumption efficiency of energy in the hybrid driving apparatus as high as possible.

In one aspect of the control apparatus for the hybrid driving apparatus of the present invention, the specifying device specifies a releasing operation amount related to an accelerator pedal releasing operation as the extent of the decelerating operation, and the controlling device performs the release preparing control if the specified releasing operation amount is greater than or equal to a first reference value.

According to this aspect, the release preparing control is performed if the accelerator pedal releasing operation amount is greater than or equal to the first reference value, which is set as what defines a considerably high possibility of the sudden braking operation being performed continuously to the releasing operation in practice, on an experimental, experiential, theoretical, or simulation basis in advance. Therefore, it is possible to prevent the reduction in power performance and comfortable performance of the vehicle, efficiently and effectively. Incidentally, "greater than or equal to" in the present invention can be easily replaced by "greater than", depending on the setting of the reference value.

Incidentally, the vehicle can be traveled in the stepless speed-change mode or in the fixed speed-change mode, and whether or not to perform the release preparing control does not have a significant effect on the travel state of the vehicle, at least as long as there is no excessive change in a travel condition. The aforementioned reduction in power performance and comfortable performance caused by the sudden reduction in the vehicle speed is a problem to be certainly avoided. Therefore, in view of such circumstances, the first reference value may be a value for defining the presence or absence of the releasing operation. In other words, the reaction torque applied to the second rotational element in accordance with the presence or absence of the accelerator pedal releasing operation (i.e. the output torque of the first electric motor) may be controlled in a binary manner. Moreover, at this time, the reaction torque applied to the second rotational element may correspond to the output torque of the engine in a one-to-one manner; namely, in this case, the fourth rotational element does not shoulder the reaction torque, and it is practically equal to the operating point being fixed in the stepless speed-change mode. Alternatively, it may be determined in accordance with an appropriate sharing rate determined as occasion demands.

In another aspect of the control apparatus for the hybrid driving apparatus of the present invention, the specifying device specifies a releasing operation speed related to an accelerator pedal releasing operation as the extent of the decelerating operation, and the controlling device controls the engaging device such that the engaging device is in the release state after the release preparing control is performed if the specified releasing operation speed is greater than or equal to a second reference value.

According to this aspect, the engaging device is controlled to be in the release state after the release preparing control is performed if the accelerator pedal releasing operation amount is greater than or equal to the second reference value, which is set as what defines a considerably high possibility of the sudden braking operation being performed continuously to the releasing operation accompanied with the releasing operation speed, on an experimental, experiential, theoretical, or simulation basis in advance. In other words, the fixed speed-change mode is changed to the stepless speed-change mode. If the accelerator pedal releasing operation speed is high, there is a high possibility of the brake pedal operation being performed continuously to the release of the accelerator pedal. By controlling the engaging device to be in the release state in conjunction with the release preparing control, it is possible to predictively prevent the reduction in power performance and comfortable performance of the vehicle. (Here, in order to control the engaging device to be in the release state, the release preparing control is inevitably necessary.)

Incidentally, in the present invention, the extent of the decelerating operation specified by the specifying device may be single or plural. Therefore, the accelerator pedal releasing operation speed and the aforementioned accelerator pedal releasing operation amount may be referred to each other, independently. As one of more specific control aspects, for example, if the release preparing control is performed when the release operation is performed on the accelerator pedal in some degree, and if the releasing operation speed at that time is greater than the second reference value, the engaging device may be controlled to be in the release state after the reaction element is changed. The change of the reaction element may be performed in the release preparing control.

In another aspect of the control apparatus for the hybrid driving apparatus of the present invention, the specifying device specifies a pressing operation amount related to a brake pedal pressing operation as the extent of the decelerating operation, and the controlling device controls the engaging device such that the engaging device is in the release state after the release preparing control is performed if the specified pressing operation amount is greater than or equal to a third reference value.

According to this aspect, the engaging device is controlled to be in the release state after the release preparing control if the pressing operation amount related to the brake pedal pressing operation is greater than or equal to the third reference value, which is set as a value or the like which can be with the sudden reduction in the vehicle speed on an experimental, experiential, theoretical, or simulation basis in advance. The sudden reduction indicates that the vehicle speed or the like is reduced to the extent that the combustion rotational speed of the internal combustion is possibly reduced to less than the aforementioned self-sustaining rotational speed, target rotational speed, or stable rotational speed, before the first engagement element is released from the second engagement element if the engaging device is released when the vehicle speed reaches to one for defining a change condition of changing the speed-change mode, as a preferred form. In other words, the fixed speed-change mode is changed to the stepless speed-change mode. Incidentally, the "pressing operation amount" increases in proportion to the tread force applied on the brake pedal. Therefore, the pressing operation amount can be conceptually uniquely treated as the tread force.

The brake pedal pressing operation amount is an index directly related to the operation state of a braking apparatus provided for the vehicle. By controlling the engaging device to be in the release state in conjunction with the release preparing control if the pressing operation amount is greater than or equal to the third reference value, it is possible to predictively prevent the reduction in power performance and comfortable performance of the vehicle. (Here, in order to control the engaging device to be in the release state, the release preparing control is inevitably necessary.)

Incidentally, as described above, in the present invention, the extent of the decelerating operation specified by the specifying device may be single or plural. The brake pedal pressing operation amount and the aforementioned accelerator pedal releasing operation amount may be referred to each other, independently. As one of more specific control aspects, for example, if the release preparing control is performed when the release operation is performed on the accelerator pedal in some degree, and if the brake pedal pressing operation amount is greater than the third reference value after the elapse of a proper time, the engaging device may be controlled to be in the release state after the reaction element is changed. The change of the reaction element may be performed in the release preparing control.

In another aspect of the control apparatus for the hybrid driving apparatus of the present invention, the controlling device controls the first electric motor such that the reaction torque applied to the second rotational element does not become zero in at least a predetermined standby time if the release preparing control is performed.

If whether or not to perform the release preparing control is uniquely changed in accordance with the extent of the decelerating operation, the state can be frequently changed between the state that at least one portion of the reaction torque is applied to the second rotational element by the release preparing control (i.e. the state that the first electric motor outputs the torque in some degree) and the state that all the reaction torque is applied to the fourth rotational element (i.e. the state that the output torque of the first electric motor is ideally zero), when the extent of the decelerating operation is frequently changed due to the drivers' characters or driving skill or the like. In this case, the loads of the control system and the first electric motor are increased, and the physical, mechanical, mechanistic, or electrical durability of the hybrid driving apparatus is possibly relatively reduced.

According to this aspect, if the release preparing control is performed, the reaction torque continues to be applied to the second rotational element in some degree for the predetermined standby time. Thus, the loads of the control system and the first electric motor are reduced, and the reduction in the physical, mechanical, mechanistic, or electrical durability of the hybrid driving apparatus is prevented. It is possible to prevent the reduction in power performance and comfortable performance of the vehicle, efficiently and effectively.

In another aspect of the control apparatus for the hybrid driving apparatus of the present invention, the engaging device performs engagement by a frictional force acting between the first and second engagement elements, and the controlling device controls the engaging device such that the specified large and small extent correspond to small and large magnitude of the frictional force, respectively.

According to this aspect, the engaging device has such an aspect that the first and second engagement elements engage with each other by the friction force acting therebetween, such as a hydraulic friction engaging apparatus. In such construction, the friction force between the first and second engagement elements can be variably controlled in a binary, stepwise, or continuous manner, through the control of the driving system such as a hydraulic driving apparatus provided for the inside and outside of the engaging device. The control of the friction force can be performed independently of the control of the output torque of the first electric motor, i.e. the control of the reaction torque applied to the second engagement element.

Here, according to this aspect, the engaging device is controlled by the controlling device such that the specified large and small extent of the decelerating operation correspond to the small and large magnitude of the frictional force, respectively. In other words, in accordance with at least an increase in the extent of the decelerating operation, the friction force between the engagement elements is reduced in a binary, stepwise, or continuous manner. Therefore, it is more certain that the reduction in power performance and comfortable performance can be prevented, compared to the case where the engaging device has such a structure that the engagement force between the first and second engagement elements can be indirectly changed by increasing the output torque of the first electric motor or the like, i.e. the structure that it is hard to actively control the engagement force, such as a engagement type engaging apparatus.

Incidentally, at this time, as a preferred form, the control to reduce the friction force is performed mutually and coordinately with the control to output the first electric motor, which is to increase the reaction torque applied to the second rotational element. In other words, the friction force acting between the engagement elements is desirably reduced in accordance with the increase in the reaction torque applied to the second rotational element. However, the friction force can be controlled independently of the sharing ratio of the reaction torque, so the friction force may be reduced even by changing the sum of output torque outputted to the driving shaft by the reaction torque applied to the second rotational element and the reaction torque applied to the fourth rotational element, according to circumstances, as an attention to safety. In this case, the driving force of the hybrid driving apparatus is possibly temporarily reduced; however, at least it is possible to prevent the internal combustion from stopping.

The nature, utility, and further features of this invention will be more clearly apparent from the following detailed description with reference to preferred embodiment of the invention when read in conjunction with the accompanying drawings briefly described below.

DETAILED DESCRIPTION OF THE PREFERRED EMBODIMENTS

Embodiments of the Invention

Hereinafter, various preferred embodiments of the present invention will be explained with reference to the drawings.

First Embodiment

Structure of Embodiment

Firstly, with reference to FIG. 1, an explanation will be given on the structure of a hybrid vehicle 10 in a first embodiment of the present invention.

Figure 1:
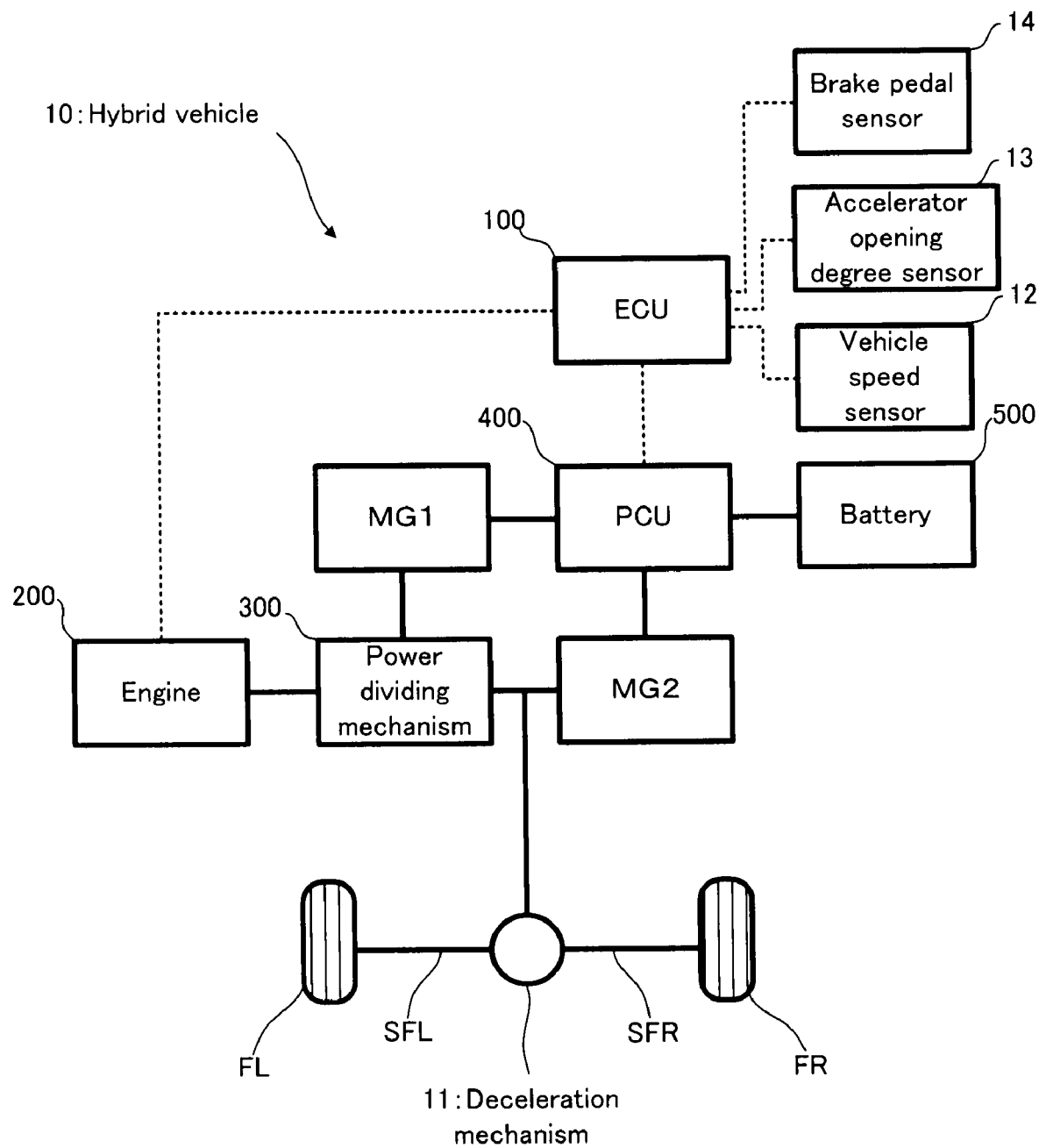
FIG. 1 is a schematic configuration diagram conceptually showing the structure of a hybrid vehicle in a first embodiment of the present invention.

FIG. 1 is a schematic configuration diagram conceptually showing the structure of the hybrid vehicle 10.

In FIG. 1, the hybrid vehicle 10 is provided with an ECU 100; an engine 200; a power dividing mechanism 300; a motor generator MG1 (hereinafter abbreviated to a "MG1", as occasion demands); a motor generator MG2 (hereinafter abbreviated to a "MG2", as occasion demands); a PCU (Power Control Unit) 400; a battery 500; and a vehicle speed sensor 600. The hybrid vehicle 10 is one example of the "vehicle" of the present invention.

The ECU 100 is provided with a CPU (Central Processing unit), a ROM (Read Only Memory), a RAM, and the like. The ECU 100 is an electronic control unit, adapted to control the entire operation of the hybrid vehicle 10, and it is one example of the "control apparatus for the hybrid driving apparatus" of the present invention. The ECU 100 can perform speed-change control described later, in accordance with a control program stored in the ROM.

Incidentally, the ECU 100 is an integrated or one-body electronic control unit, adapted to function as one example of the "specifying device" and the "controlling device" of the present invention. The respective operations of the devices are all performed by the ECU 100; however, the physical, mechanical, and electrical configurations of each of the devices are not limited to this. For example, the devices may be constructed as various computer systems such as microcomputer apparatuses, various controllers, various processing units, and a plurality of ECUs.

Figure 2:
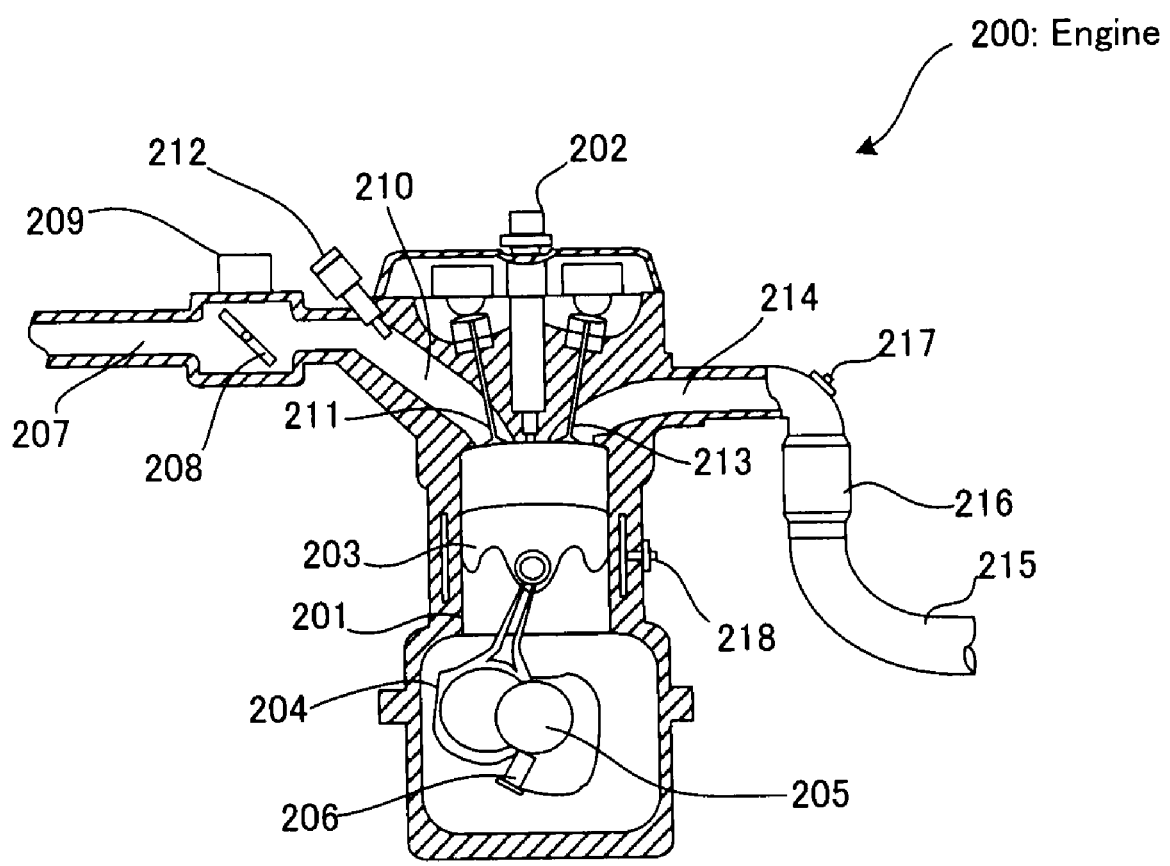
FIG. 2 is a schematic diagram showing an engine in the hybrid vehicle in FIG. 1.

The engine 200 is a gasoline engine as one example of the "internal combustion" of the present invention, and it can function as the main power source of the hybrid vehicle 10. Now, with reference to FIG. 2, the detailed structure of the engine 200 will be explained. FIG. 2 is a schematic diagram showing the engine 200. Incidentally, in FIG. 2, the repeated points of FIG. 1 carry the same reference numerals, and the explanation thereof will be omitted as occasion demands. Incidentally, the "internal combustion" of the present invention includes a two-cycle or four-cycle reciprocating engine or the like and has at least one cylinder. The "internal combustion" of the present invention conceptually includes a mechanism adapted to extract an explosive power, generated when an air-fuel mixture including various fuels, such as gasoline, light oil, or alcohol, combusts in a combustion chamber in the cylinder, as a driving force through a power transmitting device such as a piston, a connecting rod, and a crankshaft, as occasion demands. As long as such a concept is satisfied, the configuration of the internal combustion in the present invention is not limited to that of the engine 200, but may have various aspects.

In FIG. 2, the engine 200 enables the air-fuel mixture to be combusted through an ignition operation by an ignition apparatus 202 in which one portion of an ignition plug (whose reference numerical is omitted) is exposed in the combustion chamber in the cylinder 201. The engine 200 can also convert the reciprocating motion of a piston 203, caused in accordance with the explosive power by the combustion, to the rotational motion of a crankshaft 205 (i.e. one example of the "combustion output shaft" of the present invention) through a connecting rod 204.

In the vicinity of the crankshaft 205, a crank position sensor 206 is placed, which detects the rotational position of the crankshaft 205 (i.e. a crank angle). The crank position sensor 206 is electrically connected to the ECU 100 (not illustrated), and the ECU 100 can calculate the combustion rotational speed NE of the engine 200 on the basis of a crank angle signal outputted from the crank position sensor 206.

Incidentally, the engine 200 is an in-line four-cycle engine in which four cylinders 201 are aligned in a direction perpendicular to the paper. The structures of the individual cylinders 201 are equal to each other, so only one cylinder 201 will be explained in FIG. 2. The number of cylinders and the arrangement of each cylinder in the internal combustion in the present invention are not limited to those of the engine 200 but can adopt various aspects in the range satisfying the aforementioned concept; for example, an engine of a six-cylinder, eight-cylinder, or 12-cylinder type, or of a V-shaped type, of a horizontally-opposed type, or the like.

In the engine 200, the air sucked from the exterior (or intake air) is supplied through an intake tube 207 and an intake port 210 to the inside of the cylinder 201 in the opening of an intake valve 211. On the other hand, the fuel injection valve of an injector 212 is exposed in the intake port 210, and it is adapted to inject the fuel to the intake port 210. The fuel injected from the injector 212 is mixed with the intake air before or after the opening timing of the intake valve 211, to thereby make the aforementioned air-fuel mixture.

The fuel is stored in a not-illustrated fuel tank and is supplied to the injector 212 through a not-illustrated delivery pipe by the operation of a not-illustrated feed pump. The air-fuel mixture combusted in the cylinder 201 becomes an exhaust gas and is supplied to an exhaust tube 215 through an exhaust port 214 in the opening of an exhaust valve 213 which opens or closes in conjunction with the opening or closing of the intake valve 211.

On the other hand, on the upstream side of the intake port 210 in the intake tube 207, a throttle valve 208 is disposed, which adjusts an intake air amount associated with the intake air supplied through a not-illustrated cleaner. The throttle valve 208 is constructed such that the driving state thereof is controlled by a throttle valve motor 209, which is electrically connected to the ECU 100. Incidentally, the ECU 100 basically controls the throttle valve motor 209 to obtain a throttle opening degree according to the opening degree of an accelerator pedal not illustrated (hereinafter referred to as an "accelerator opening degree", as occasion demands); however, it can also adjust the throttle opening degree without a driver's will through the operation control of the throttle valve motor 209. In other words, the throttle valve 208 is constructed as a kind of electronically-controlled throttle valve.

In the exhaust tube 215, a ternary catalyst 216 is placed. The ternary catalyst 216 is a catalyst apparatus adapted to purify each of CO (carbon monoxide), HC (hydrocarbon), and NOx (nitrogen oxide), emitted from the engine 200. Incidentally, in the engine 200, various catalysts such as a NSR catalyst (or NOx storage-reduction catalyst) or an oxidation catalyst may be placed, instead of or in addition to the ternary catalyst 216.

Moreover, in the exhaust tube 215, an air-fuel ratio sensor 217 is placed, which can detect the exhaust air-fuel ratio of the engine 200. Moreover, in a water jacket placed in a cylinder block for accommodating the cylinder 201, a water temperature sensor 218 is disposed in order to detect a coolant temperature associated with a coolant (LLC) circulated and supplied to cool the engine 200. The air-fuel ratio sensor 217 and the temperature sensor 218 are electrically connected to the ECU 100, and the detected air-fuel ratio and the detected coolant temperature are grasped by the ECU 100 at a constant or inconstant frequency.

Back in FIG. 1, the motor generator MG1 is an electric motor generator as one example of the "first electric motor" of the present invention, adapted to mainly generate electricity for charging a battery 500 or for supplying electricity to the motor generator MG2 by being driven by torque from the engine 200 and being rotated. The motor generator MG1 can continuously change the combustion rotational speed NE of the engine 200 through the control of the rotational speed thereof. Such a stepless speed change function is due to the differential operation of the power dividing mechanism 300 described later. Incidentally, the motor generator MG1 can also function as an electric motor, depending on the travel state of the hybrid vehicle 10.

The motor generator MG2 is an electric motor generator as one example of the "second electric motor" of the present invention, adapted to function as an electric motor for assisting the power of the engine 200 or as an electric generator for charging the battery 500. More specifically, the motor generator MG2 is an apparatus for aiding (or assisting) a driving force or a braking force. If assisting the driving force, the motor generator MG2 is supplied with electricity and functions as the electric motor. If assisting the braking force, the motor generator MG2 is rotated by torque transmitted from the driving wheel side of the hybrid vehicle 10 and functions as the electric generator for generating electricity.

Incidentally, each of the motor generator MG1 and the motor generator MG2 is constructed as, for example, a synchronous electric motor generator, and it is provided with a rotor having a plurality of permanent magnets on the outer circumferential surface; and a stator having a three-phase coil for forming a rotating magnetic field; however, it may be another form of motor generator. The motor generator MG2 has such a structure that the output rotational shaft thereof is connected to a driving shaft 320 described later (i.e. one example of the "driving shaft" of the present invention) to allow the driving shaft 320 to be supplied with the power, wherein the driving shaft 320 is connected through a deceleration mechanism 11 including various reduction gear apparatuses, such as a differential, to drive shafts SFL and SFR, which are connected to a left front wheel FL and a right front wheel FR as the driving wheels of the hybrid vehicle 10, respectively. In other words, the rotational speed of the driving shaft 320 is uniquely or unambiguously related to the rotational speed Nmg2 of the motor generator MG2.

The PCU 400 includes an inverter or the like, which is adapted to convert a direct-current (DC) power extracted from the battery 500 to an alternating-current (AC) power and to supply it to the motor generators MG1 and MG2, and which is adapted to convert an AC power generated by the motor generators MG1 and MG2 to a DC power and to supply it to the battery 500. The PCU 400 is a control unit adapted to individually control the input/output of the power between the battery 500 and each motor generator. The PCU 400 is electrically connected to the ECU 100, and the PCU 400 is controlled by the ECU 100.

The battery 500 is a chargeable accumulator or storage battery, adapted to function as a power supply source associated with the power for power-running the motor generators MG1 and MG2.

A vehicle-speed sensor 12 can detect the vehicle speed V of the hybrid vehicle 10. The vehicle-speed sensor 12 is electrically connected to the ECU 100, and the detected vehicle speed V is grasped by the ECU 100 at a constant or inconstant frequency.

An accelerator opening degree sensor 13 can detect the operation amount of an accelerator pedal, not illustrated and provided for the hybrid vehicle 10. The accelerator opening degree sensor 13 is electrically connected to the ECU 100, and the detected accelerator opening degree acc is grasped by the ECU 100 at a constant or inconstant frequency.

A brake pedal sensor 14 can detect the operation amount of a brake pedal (i.e. uniquely regarded as a brake pedal force), not illustrated and provided for the hybrid vehicle 10. The brake pedal sensor 14 is electrically connected to the ECU 100, and the detected brake pedal operation amount brk (i.e. one example of the "pressing operation amount associated with the brake pedal pressing operation" in the present invention) is grasped by the ECU 100 at a constant or inconstant frequency.

Figure 3:
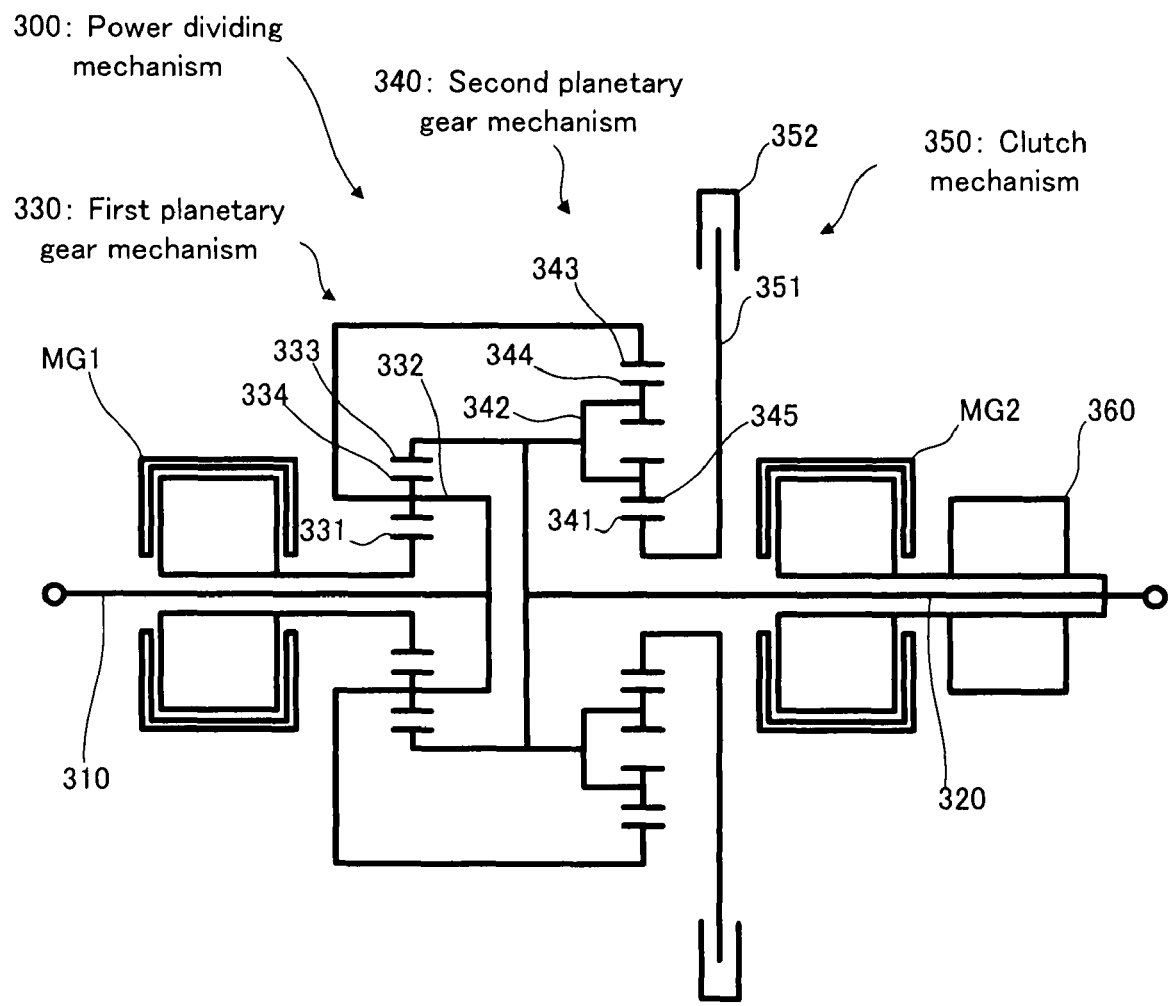
FIG. 3 is a schematic configuration diagram conceptually showing the structure of a power dividing mechanism in the hybrid vehicle in FIG. 1.

The power dividing mechanism 300 is a complex planetary gear unit, as one example of the "power dividing device" of the present invention, adapted to physically control the input/output state of the power between the driving shaft 320 and each of the engine 200 and the motor generators MG1 and MG2. Now, with reference to FIG. 3, the detailed structure of the power dividing mechanism 300 will be explained. FIG. 3 is a schematic configuration diagram conceptually showing the structure of the power dividing mechanism 300. Incidentally, in FIG. 3 the repeated points of FIG. 1 carry the same reference numerals, and the explanation thereof will be omitted as occasion demands.

In FIG. 3, the power dividing mechanism 300 can divide the output torque of the engine 200 (hereinafter referred to as "engine torque", as occasion demands) into the motor generator MG1 and the driving shaft 320, and it is provided with a plurality of rotational elements which mutually cause the differential operation. More specifically, the power dividing mechanism 300 is provided with a plurality of pairs of differential mechanisms. An input shaft 310 is connected to the first rotational element of the three rotational elements which mutually cause the differential operation. The rotational shaft of the motor generator MG1 is connected to the second rotational element. The driving shaft 320 is connected to the third rotational element. The input shaft 310 is connected to the crankshaft 205 of the engine 200 described above, and the driving shaft 320 is connected to the rotational shaft of the motor generator MG2, as described above, and to a MG2 speed-changing part 360 described later. In other words, each of the engine 200 and the motor generators MG1 and MG2 is connected to the power dividing mechanism 300.

The power dividing mechanism 300 is formed as a so-called Ravigneaux planetary gear mechanism, provided with a first planetary gear mechanism 330 of a single pinion gear type; and a second planetary gear mechanism 340 of a double pinion type, as the differential mechanism.

The first planetary gear mechanism 330 is provided with a sun gear 331; a carrier 332; a ring gear 333; and a pinion gear 334, which engages with the sun gear 331 and the ring gear 332 and which is held by the carrier 332 so as to rotate in an axial direction and to revolve because of the rotation of the carrier 332. The motor generator MG1 is connected to the sun gear 331. The input shaft 310 is connected to the carrier 332. The driving shaft 320 is connected to the ring gear 333.

The second planetary gear mechanism 340 is provided with a sun gear 341; a carrier 342; a ring gear 343; a pinion gear 344, which engages with the ring gear 343; and a pinion gear 345, which engages with the sun gear 331, wherein each of the pinion gears 344 and 345 is held by the carrier 342 so as to rotate in an axial direction and to revolve because of the rotation of the carrier 342. A clutch plate 351 of a clutch mechanism 350 described later is connected to the sun gear 341. The ring gear 333 of the first planetary gear mechanism 330 is connected to the carrier 342. The carrier 332 of the first planetary gear mechanism 330 is connected to the ring gear 343.

As described above, as a whole, the power dividing mechanism 300 is provided with the four rotational elements in total, which are the sun gear 331 of the first planetary gear mechanism 330; the sun gear 341 of the second planetary gear mechanism 340; the carrier 332 of the first planetary gear mechanism 330 and the ring gear 343 of the second planetary gear mechanism 340, which are mutually connected; and the ring gear 333 of the of the first planetary gear mechanism 330 and the carrier 342 of the second planetary gear mechanism 340, which are mutually connected. The sun gear 331 is one example of the "second rotational element" of the present invention. The sun gear 341 is one example of the "fourth rotational element" of the present invention. The carrier 332 and the ring gear 343 are one example of the "first rotational element" of the present invention. The ring gear 333 and the carrier 342 are one example of the "third rotational element" of the present invention.

The clutch mechanism 350 is an engaging apparatus of a rotational-synchronizing engaging type as one example of the "engaging device" of the present invention, including a dog clutch.

The clutch plate 351 is one example of the "first engagement element" of the present invention, wherein the clutch plate 351 is connected to the sun gear 341 of the second planetary gear mechanism 340, and the clutch plate 351 and the sun gear 341 can rotate in pairs. On the engagement surface of the clutch plate 351 facing the clutch plate 352, a plurality of dog teeth are formed, which make a physical unevenness part. Moreover, the clutch plate 352 is one example of the "second engagement element" of the present invention, wherein the clutch plate 352 is physically fixed to the case part of the power dividing mechanism 300. On the engagement surface of the clutch plate 352 facing the clutch plate 351, a plurality of dog teeth are formed, which are the same as the dog teeth of the clutch plate 351 and which can mutually engage with the dog teeth of the clutch plate 351. In the engagement of the clutch mechanism 350, the dog teeth formed on the clutch plate 351 and the dog teeth formed on the clutch plate 352 engage with each other. At this time, since the clutch plate 351 is physically fixed, the rotation of the clutch plates 351 and the rotation of the sun gear 341 connected to the clutch plates 351 are stopped, and the clutch 351 and the sun gear 341 also get physically fixed.

Incidentally, the clutch mechanism 350 is provided with a driving apparatus for driving the clutch plate 351 and a resolver for detecting the rotation angle of the clutch plate 351 (both of which are not illustrated), in addition to the illustrated clutch plates 351 and 352. The driving apparatus is a driving force applying device, adapted to apply a driving force for stroking the clutch plate 351 in its rotation direction and a direction of the clutch plate 352. The driving apparatus is electrically connected to the ECU 100, and the operation of the driving apparatus is superior-controlled by the ECU 100.

The resolver is an angle sensor, adapted to detect the rotation phase of the clutch plate 351. The resolver is electrically connected, and the detected rotation phase (or angle) of the clutch plate 351 is grasped by the ECU 100 at a constant or inconstant frequency.

Incidentally, the construction that the "engaging device" of the present invention can adopt is not limited to the clutch mechanism 350, but it may be another type of engaging device, or various friction engaging apparatuses driven in accordance with a hydraulic pressure or electromagnetic force, or various engaging apparatuses having another physical, mechanical, or electric engagement aspect.

The power dividing mechanism 300 is also provided with the MG2 speed-changing part 360. The MG2 speed-changing part 360 is placed on a power transmission path between the rotational shaft of the motor generator MG2 and the driving shaft 320, and it is provided with a plurality of friction engaging apparatuses; and driving apparatuses, such as hydraulic actuators, for driving the respective friction engaging apparatuses. The MG2 speed-changing part 360 can change a rotational speed ratio between the rotational shaft of the motor generator MG2 and the driving shaft 320 in a stepwise manner, by the combination of contact states of the respective plurality of friction engaging apparatuses. The change gear ratio of the MG2 speed-changing part 360 is controlled accordingly by the ECU 100 through the control of the aforementioned driving apparatuses such that the motor generator MG2 does not exceed the maximum rotational speed and such that the motor generator MG2 rotates in as a highly efficient rotation area as possible.

As described above, the hybrid vehicle 10 is provided, as the driving apparatuses thereof, with the engine 200, the motor generator MG1, the motor generator MG2, and the power dividing mechanism 300. These are, namely, one example of the "hybrid driving apparatus" of the present invention.

Operation of Embodiment

<Details of Speed-Change Mode>

The power dividing mechanism 300 functions as the speed-changing apparatus or gearbox of the hybrid vehicle 10. At this time, in the power dividing mechanism 300, the following two types of speed-change modes are selectively realized: a stepless speed-change mode and a fixed speed-change mode.

When the power dividing mechanism 300 drives the engine 200 in the condition that the corresponding rotational element (which is the sun gear 341 of the second planetary gear mechanism 340 in this case) is not fixed by the clutch mechanism 350, the engine torque is divided into and transmitted to the motor generator MG1 and the driving shaft 320, by the power dividing mechanism 300. This is due to the differential operation of the power dividing mechanism 300. By increasing or decreasing the rotational speed of the motor generator MG1, the combustion rotational speed NE of the engine 200 is controlled in a stepless (or continuous) manner. This is a stepless speed-change state (or variable speed state), and the speed-change mode corresponding to the stepless speed-change state is the stepless speed-change mode.

In the stepless speed-change mode, only the first planetary gear mechanism 330 substantially contributes to the transmission of the engine torque to the driving shaft 320. The combustion rotational speed NE of the engine 200 in the stepless speed-change mode is controlled, with a value corresponding to an optimum fuel consumption operating point being set as a target rotational speed, such that the operating point of the engine 200 (an operational condition defined as a combination of the combustion rotational speed and a load (i.e. uniquely regarded as the engine torque) is the optimum fuel consumption operating point at which the fuel consumption of the engine 200 is minimal.

In contrast, if the sun gear 341 as one rotational element of the power dividing mechanism 300 is physically fixed by the clutch mechanism 350, the speed-change ratio of the power dividing mechanism 300 (i.e. a ratio of the combustion rotational speed NE of the engine 200 and the rotational speed Nout of the driving shaft 320 (hereinafter referred to as an "output rotational speed Nout", as occasion demands)) is fixed to one speed-change ratio, so that the fixed speed-change ratio is realized. More specifically, in the planetary gear mechanism, if the rotational speeds of two of the three elements, which are the sun gear, the carrier, and the ring gear, are determined, the rotational speed of the remaining one element is inevitably determined. In the second planetary gear mechanism 340, the output rotational speed Nout having a one-to-one relationship with the rotational speed of the carrier 342 is uniquely determined from the vehicle speed of the hybrid vehicle 10, and if the sun gear 341 is fixed and the rotational speed becomes zero, then the rotational speed of the ring gear 343 as one remaining element is inevitably determined. The ring gear 343 is connected to the carrier 332 of the first planetary gear mechanism 330 as described above, and the carrier 332 is connected to the input shaft 320, which is connected to the crankshaft 205 of the engine 200. Therefore, the combustion rotational speed NE of the engine 200 also inevitably has a one-to-one relationship with the rotational speed of the ring gear 343. In other words, in the fixed speed-change mode, the change characteristics of the combustion rotational speed NE of the engine 200 is uniquely determined in accordance with the vehicle speed V.

As described above, in the condition that the sun gear 341 is fixed by the clutch mechanism 350, a reaction element having the reaction torque of the engine torque in the power dividing mechanism 300 is transferred from the sun gear 331 (i.e. uniquely regarded as the motor generator MG1) to the sun gear 341 (i.e. uniquely regarded as the clutch mechanism 350), and only the second planetary gear mechanism 340 substantially contributes to the transmission of the engine torque to the driving shaft 320. Therefore, it is unnecessary to make the motor generator MG1 function as the electric generator and the electric motor, and there is no need to generate electricity on the motor generator MG2 and to feed it to the motor generator MG1, or to feed electricity from the battery 500 to the motor generator MG1. In other words, there is no electricity consumption; namely, in the fixed speed-change mode, there is no power loss caused by repeating the energy conversion between mechanical energy and electrical energy, i.e. power circulation, so that it is possible to prevent or limit or control poor fuel efficiency.

Figure 4:
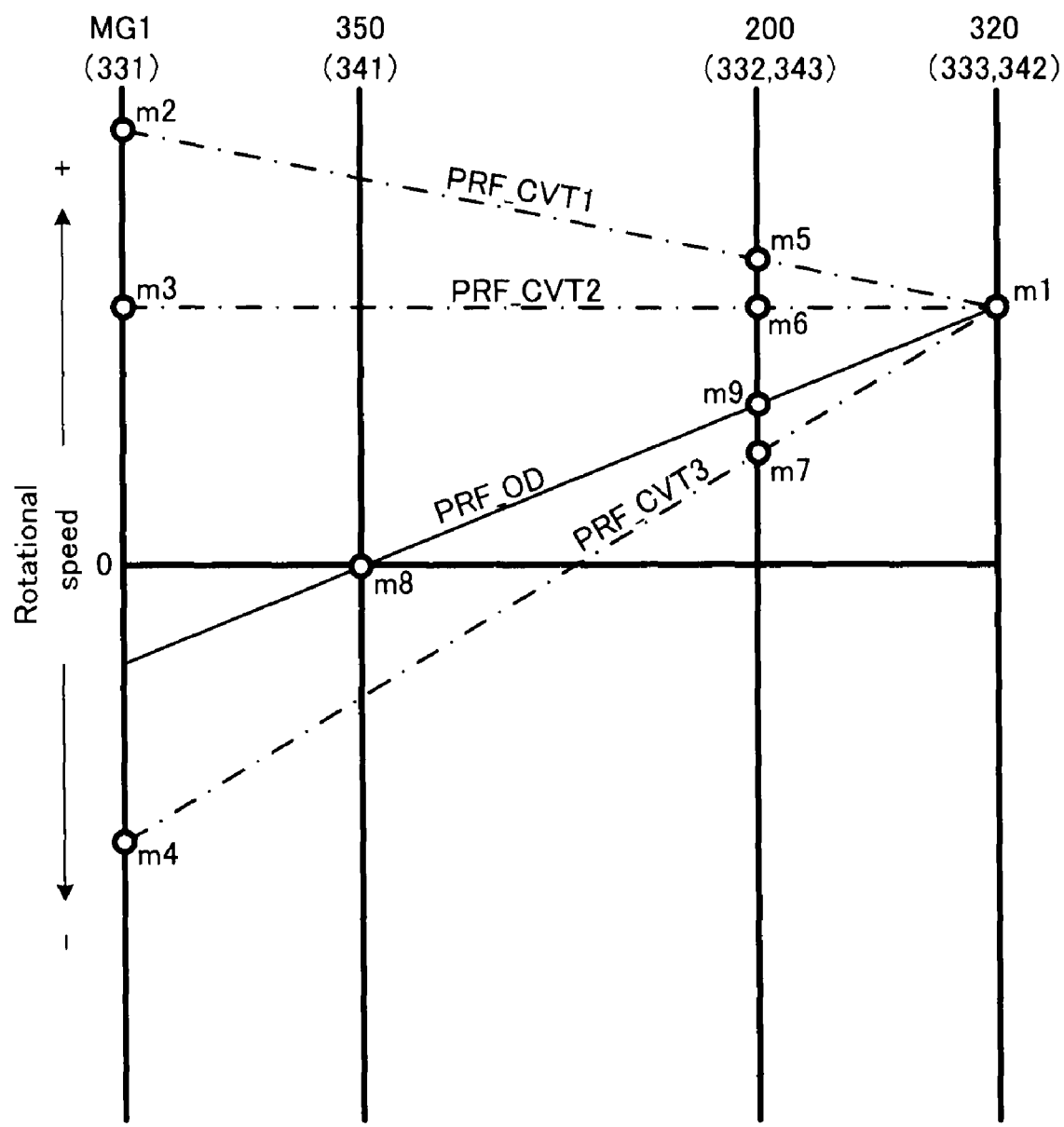
FIG. 4 is a nomogram corresponding to each speed-change mode realized in the power dividing mechanism in FIG. 3.

Now, with reference to FIG. 4, the stepless speed-change mode and the fixed speed-change mode will be further explained. FIG. 4 is a nomogram of the power dividing mechanism 300 corresponding to each speed-change mode. Incidentally, in FIG. 4, the repeated points of FIG. 1 carry the same reference numerals, and the explanation thereof will be omitted as occasion demands.

In FIG. 4, from the left, the MG1 (i.e. uniquely regarded as the sun gear 331), the clutch mechanism 350 (i.e. uniquely regarded as the sun gear 341), the engine (i.e. uniquely regarded as the carrier 332 and the ring gear 343), and the driving shaft 320 (i.e. uniquely regarded as the carrier 333 and the ring gear 342) are shown in this order, and the rotational speeds thereof are shown on the vertical axis. Incidentally, it is assumed that the MG2 speed-change part 360 is fixed to one speed-change ratio.

Characteristic lines for illustrating the respective rotational speeds according to the stepless speed-change mode are shown as illustrated PRF_CVTn (n=1, 2, 3) (refer to chain lines). In the stepless speed-change mode, the combustion rotational speed NE of the engine 200 can be continuously controlled by increasing or decreasing the rotational speed of the motor generator MG1. For example, when the output rotational speed Nout (i.e. uniquely regarded as the rotational speed of the drive shaft; namely, uniquely regarded as the vehicle speed) is a white circuit m1 illustrated, for example, if the rotational speed Nmg1 of the MG1 is sequentially changed to illustrated open circles m2, m3, and m4, the combustion rotational speed NE is sequentially changed to illustrated open circles m5, m6, and m7, which are a higher value, an equal value, and a lower value than the output rotational speed Nout, respectively.

Here, the characteristic illustrated in PRFCVT3 corresponds to a so-called overdrive state, in which the combustion rotational speed NE is lower than the output rotational speed Nout. If the overdrive state is realized in the stepless speed-change mode, the motor generator MG1 outputs the reaction torque (negative torque) of the engine torque in a negative rotation area, and the driving state thereof becomes a power-running state. On the other hand, on the motor generator MG2, in order to supply electricity to the MG1 in the power-running state (or to absorb the driving force outputted to the driving shaft 320 by power-running the MG1), the negative torque is outputted in a positive rotation area, and electricity is generated. As a result, if it is tried to realize the overdrive state in the stepless speed-change mode, the energy loss by the power circulation is hardly avoided depending on circumstances (in particular, in a high-rotation, light-load area).

On the other hand, in the condition that the clutch plates 351 and 352 of the clutch mechanism 350 engage with each other, the rotational speed of the clutch mechanism 350 is zero (refer to a open circle m8 illustrated), and the characteristic of the rotational speed of the power dividing mechanism 300 is in the state illustrated by PRF_OF. (refer to a slid line). In other words, the combustion rotational speed NE of the engine 200 is fixed to a lower value than the output rotational speed Nout (refer to a open circle m9 illustrated). In other words, the speed-change ratio of the power dividing mechanism 300 is fixed to an overdrive speed-change ratio (i.e. one example of the "fixed speed-change ratio" of the present invention), so that the overdrive state is realized. In this state, the reaction torque is applied to the sun gear 341 from the clutch mechanism 350, and the sun gear 341 function as a reactive element. Thus, it is unnecessary to make the motor generator MG1 function as either the electric generator or the electric motor, and the motor generator MG1 is substantially idling. Thus, it is unnecessary to supply electricity to the motor generator MG1 from the motor generator MG2, and the power circulation can be avoided.

The speed-change mode of the hybrid vehicle 10 is normally determined to be one of the two types of speed-change modes that provides better fuel consumption (i.e. highly efficient), depending on an operational condition required for the hybrid vehicle 10 at that time or an actual operational condition or the like of the hybrid vehicle 10. For example, the overdrive state by the fixed speed-change mode is realized in high-speed, light-load travelling such as high-speed, steady travelling in which the operating point of the engine 200 is hardly set on the optimum fuel consumption line. The speed-change modes are changed, as occasion demands, by speed-change control performed by the ECU 100.

In particular, in the condition that the fixed speed-change mode is selected as the speed-change mode, the combustion rotational NE of the engine 200 has a unique relationship with the vehicle speed V. Therefore, if the vehicle speed V is excessively reduced, the combustion rotational NE is also excessively reduced; for example, it is possibly reduced to be less than a self-sustaining rotational speed peculiar to the engine 200. In the condition that the combustion rotational NE is excessively reduced as described above, various problems are possibly actualized, such as a reduction in power performance due to a reduction in the driving force caused by a reduction in combustion performance and a reduction in comfortable performance due to knocking or physical vibration. Moreover, according to circumstances, the engine 200 is possibly in a combustion stop state.

At this time, normally, a speed-change condition is defined to change to the stepless speed-change mode in accordance with the reduction in the vehicle speed, and this type of problem is unlikely to occur in a normal deceleration range; however, if the vehicle speed is excessively reduced because of sudden braking for some reasons, this type of problem is likely actualized because it is not in time to make such control that the clutch mechanism 350 is shifted into a release state. Thus, in the speed-change control performed by the ECU 100, it is possible to change the speed-change mode while limiting or controlling the occurrence of this type of problem.

Figure 5:
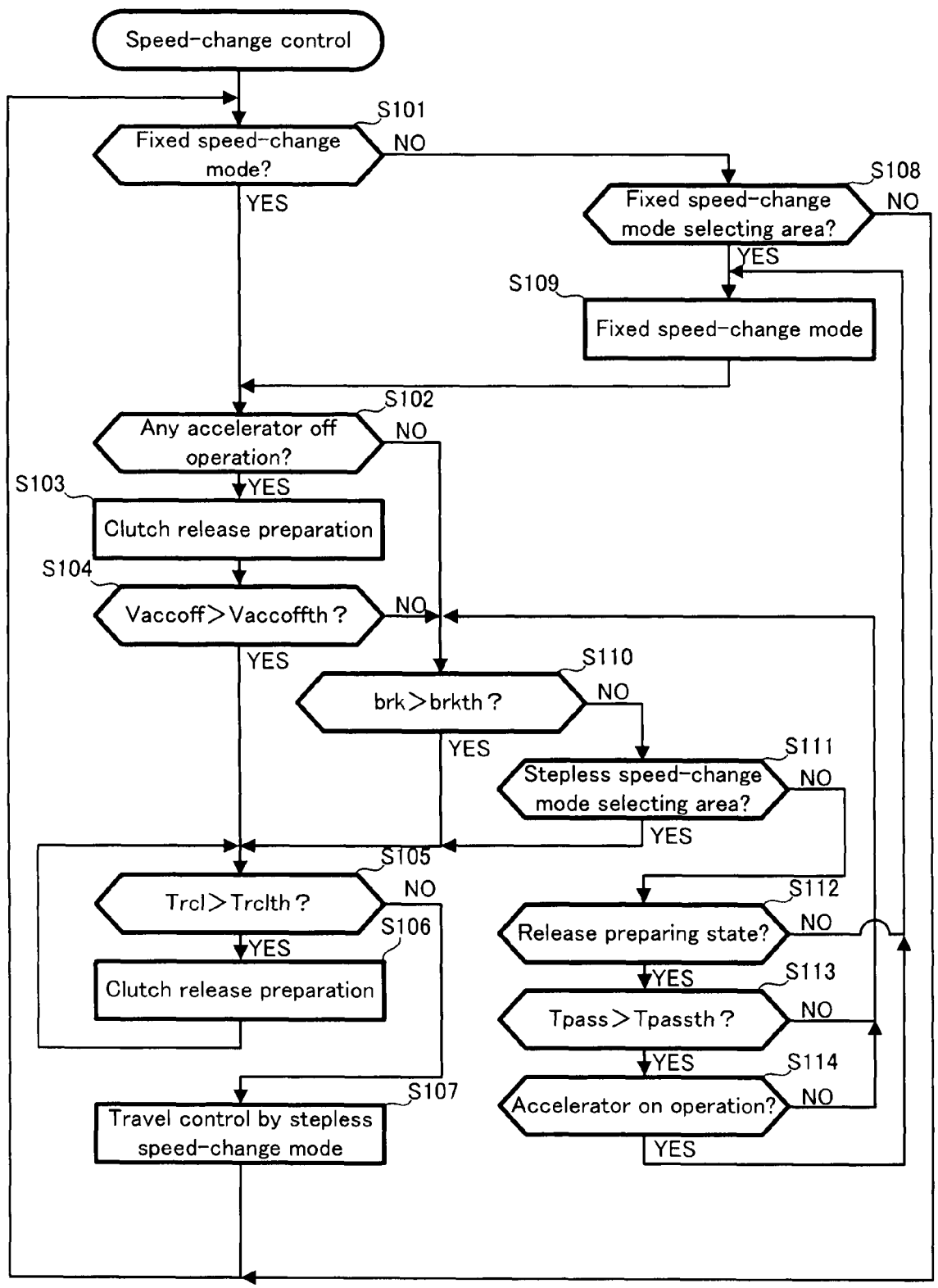
FIG. 5 is a flowchart showing speed-change control performed by an ECU in the hybrid vehicle in FIG. 1.

Now, with reference to FIG. 5, the details of the speed-change control will be explained. FIG. 5 is a flowchart showing speed-change control.

In FIG. 5, the ECU 100 judges or determines whether or not the fixed speed-change mode is selected (step S101). If the stepless speed-change mode is selected (the step S101: NO), the ECU 100 judges whether or not the travel condition of the hybrid vehicle 10 corresponds to a fixed speed-change mode selecting area (step S108).

Here, the speed-change mode is selectively changed between the stepless speed-change mode and the fixed speed-change mode, on the basis of the vehicle speed V detected by the vehicle speed sensor 12 and the accelerator opening degree acc detected by the accelerator opening degree sensor 13. More specifically, the ECU 100 selects the fixed speed-change mode if the travel condition of the hybrid vehicle 10, defined by the combination of the vehicle speed V and the accelerator opening degree, corresponds to a predetermined high-speed, light-load area, which is set as providing the aforementioned power circulation, and the ECU 100 selects the stepless speed-change mode in the other area.

If the travel condition of the hybrid vehicle 10 does not correspond to the fixed speed-change mode selecting area (the step S108: NO), the ECU 100 returns the processing to the step S101 to repeat the series of processes (i.e. travel control by the stepless speed-change mode is continued). If the travel condition of the hybrid vehicle 10 corresponds to the fixed speed-change mode selecting area (the step S108: YES), the ECU 100 selects the fixed speed-change mode and changes the speed-change mode from the stepless speed-change mode to the fixed speed-change mode (step S109). When the speed-change mode is changed to the fixed speed-change mode, the processing is transferred to a step S102.

Now, in changing to the fixed speed-change mode in the step S109, if the engagement of the clutch mechanism 350 is not completed, a clutch engaging process is performed.

The clutch engaging process will be briefly explained. Firstly, rotational synchronization and phase synchronization are performed in the clutch mechanism 350. Here, the "rotational synchronization" indicates the synchronization of the rotational speed between the clutch plates 351 and 352. In this embodiment, the clutch plate 352, which is the engagement target of the clutch plate 351, is a so-called physically fixed brake, so that the rotational speed thereof is zero. Therefore, the ECU 100 controls the rotational speed of the motor generator MG1 such that the rotational speed of the clutch plate 351 is zero. The target value of the rotational speed of the motor generator MG1 at this time is calculated as the value that is uniquely determined in accordance with the output rotational speed Nout on the basis of the speed-change ratio of the sun gear 331, the sun gear 341, the carrier 332 (or the ring gear 343), and the ring gear 342 (or the carrier 333).

On the other hand, the phase synchronization is a process derived from the fact that the engaging device of the present invention is the dog clutch, and it is a process of accommodating the phases of the dog teeth formed on the engagement surface between the clutch plates 351 and 352, at a position at which the clutch plates can engage with each other. At this time, the clutch plate 352 is physically stopped, and information on the engageable position is provided in advance for the ECU 100. The ECU 100 refers to the rotation angle of the clutch plate 351 detected by the resolver provided for the clutch mechanism 350 and controls a driving circuit provided for the clutch mechanism such that the rotation angle of the clutch late 351 has a predetermined value. The rotational synchronization and the phase synchronization are performed in this manner.

When the rotational synchronization and the phase synchronization are completed in the clutch mechanism 350, the ECU 100 makes the clutch mechanism 350 engage. In other words, the driving circuit is controlled such that the clutch plate 351 is stroked by a predetermined amount in the direction of the clutch plate 352, which enables the both dog teeth to engage with each other, and then the clutch engaging process is completed.

When the clutch engaging process is completed and the clutch mechanism 350 is transferred into the engagement state, then a reaction-element changing process is started; namely, the reaction torque of the engine torque starts to be delivered from the sun gear 331, which is connected to the motor generator MG1, to the sun gear 341, which is connected to the clutch plate 351. In the reaction-element changing process, the output torque Trmg1 of the motor generator MG1 is gradually reduced, with target torque Trmg1*tb* being zero. More specifically, the ECU 100 reduces previously indicated torque value by a predetermined change amount in each predetermined processing cycle, to thereby set provisional indicated torque and gradually reduce the output torque Trmg1 of the motor generator MG1 through the control of the PCU 400. With the gradual reduction in the output torque Trmg1, the reaction torque gradually acts on the sun gear 341, and when the output torque Trmg1 is controlled to the target value, zero, the reaction torque of the engine torque is all applied to the clutch mechanism 350.

As described above, in the embodiment, the clutch engaging process and the reaction element changing process, which is performed after the completion of the clutch engaging process, are required when the speed-change mode is changed from the stepless speed-change mode to the fixed speed-change mode, and travel control according to the fixed speed-change mode is realized when the reaction element changing process is ended.

On the other hand, in the judging process in the step S101, if it is judged that the fixed speed-change mode is selected (the step S101: YES), the processing is transferred to a step S102. In a process associated with the step S102, it is judged whether or not an accelerator off operation is performed.

The accelerator off operation is an operation of changing the accelerator opening degree acc to a reduction side (a release side in terms of an accelerator pedal or gas pedal), such as easing up on the accelerator pedal or lifting one's foot off the accelerator pedal. The accelerator off operation corresponds to that the change amount of the accelerator opening degree acc has a negative value. The ECU 100 stores the detected value of the accelerator opening degree acc in a rewritable memory area such as a RAM or a flush memory with respect to certain samples in the past, and the ECU 100 judges that the accelerator off operation is performed if the deviation "acc(i)−acc(i−1)" between the newest value, acc (i), and a value one sample before, acc(i−1), has a negative value. In other words, the deviation "acc(i)−acc(i−1)" if taking the negative value is one example of the "releasing operation amount related to the accelerator pedal releasing operation" in the present invention. In the embodiment, the value corresponding to the "first reference value" of the present invention is zero. Incidentally, the absolute value of the deviation "acc (i)−acc(i−1)" if taking the negative value is referred to as an "accelerator off operation amount", as occasion demands.

If the accelerator off operation is performed (the step S102: YES), the ECU 100 performs a clutch release preparing process (step S103). The clutch release preparing process corresponds to preparation for transferring the clutch mechanism 350 into the release state, and it indicates the reaction element changing process. In other words, specifically, as opposed to the aforementioned reaction element changing process, the output torque of the motor generator MG1 with the initial output torque of zero is gradually increased such that at least one of the reaction torque is applied to the sun gear 331. At this time, all the reaction torque may end up being applied to the sun gear 331, or the reaction torque may be applied to both the sun gear 331 and the sun gear 341.

Incidentally, in the embodiment, the output torque of the motor generator MG1 is controlled such that all the reaction torque ends up being applied to the sun gear 341. One of the reasons is that the clutch mechanism 350 is the dog clutch mechanism. In other words, in this type of engaging device of a rotational-synchronizing engaging type, the clutch plate substantially cannot be released in the condition that the torque is applied to the engaging device, and it is desired that all the reaction torque is substantially borne on the motor generator MG1 side in order to immediately release the clutch. The practical benefits of the present invention, however, can be ensured as long as the reaction torque is borne on the MG1 side in some degree.

If the clutch release preparing process is performed, the ECU 100 judges whether or not an accelerator off speed Vaccoff which denotes an operation speed related to the accelerator off operation (i.e. one example of the releasing operation speed related to the accelerator pedal releasing operation" in the present invention) is greater than a reference value Vaccoffth set in advance (i.e. one example of the "second reference value" of the present invention) (step S104). Here, the reference value Vaccoffth is set as a value corresponding to the indication that a sudden operation for a brake pedal (i.e. an operation of providing sudden braking) is highly likely performed after the accelerator off operation, on an experimental, experiential, theoretical, or simulation basis or the like in advance. Incidentally, the accelerator off speed Vaccoff is a value of the accelerator off operation amount per unit time.

If the accelerator off speed Vaccoff is less than or equal to the reference value Vaccoffth (the step S104: NO) or if the accelerator off operation is not performed (the step S102: NO), the ECU 100 further judges whether or not the brake pedal operation amount brk is greater than a reference value brkth (i.e. one example of the "third reference value" of the present invention) (step S110). Here, the reference value brkth is set as a value corresponding to the indication that the vehicle speed is highly likely reduced suddenly enough to provide the excessive reduction in the combustion rotation speed NE of the engine 200, on an experimental, experiential, theoretical, or simulation basis or the like in advance.

If the brake pedal operation amount brk is greater than the reference value brkth (the step S110: YES) or if the accelerator off sped Vaccoff is greater than the reference value Vaccoffth (the step S104: YES), the ECU 100 judges whether or not reaction torque Trcl applied to the clutch mechanism 350 is greater than a reference value Trclth (step S105). The reference value Trclth is set a value corresponding to the indication that the clutch plate 351 can be released from the clutch plate 352 without any trouble, and it is almost zero in the embodiment. In other words, the process in the step S105 corresponds to a process of judging whether or not the clutch mechanism 350 can be immediately transferred into the release state.

Here, if the clutch release preparing process in the step S103 is passed through, the reaction torque Trcl applied to the clutch mechanism 350 at the time of the judging process in the step S105 is possibly reduced to be the reference value Trclth or less; however, the procedure of gradually increasing the output torque Trmg1 of the motor generator MG1 may not be ended. If it is judged that there arises a need to release the clutch mechanism 350 on the basis of the brake pedal operation amount, directly, without through the process in the step S103, then, the speed-change mode is the normal fixed speed-change mode (i.e. the fixed speed-change mode corresponding to the condition that the sun gear 341 is set as the reaction element), and the clutch mechanism 350 is in the engagement state.

If the reaction torque Trcl applied to the clutch mechanism 350 is greater than the reference value Trclth (the step S105: YES), i.e. if the clutch mechanism 350 is not transferred into the release state, the ECU 100 performs the clutch release preparing process, as in the step S103 (step S106).

Incidentally, at this time, the target value Trmg1$tg$ of the output torque of the motor generator MG1 is determined such that the all the reaction torque is applied to the sun gear 331. In other words, in the step S103, if the clutch release preparing process is already performed such that all the reaction torque is applied to the sun gear 331, the process in the step S103 and the process in the step S105 may be mutually equal control. When the clutch release preparing process is performed, the processing is returned to the step S105.

If the reaction torque Trcl applied to the clutch mechanism 350 is less than or equal to the reference value Trclth (the step S105: NO), i.e. if the clutch plate 351 can be released from the clutch plate 352, the ECU 100 controls the driving apparatus of the clutch mechanism 350 such that the clutch plate 351 is released from the clutch plate 352 and starts the travel control by the stepless speed-change mode (step S107). When the travel control by the stepless speed-change mode is started, the processing is returned to the step S101.

In the process in the step S110, if the brake pedal operation amount brk is less than or equal to the reference value brkth (the step 110: NO), the ECU 100 judges whether or not the travel condition of the hybrid vehicle corresponds to a stepless speed-change mode selecting area (step S111). The judging process in the step 111, as in the process in the step S108, is performed on the basis of the vehicle speed V and the accelerator opening degree acc. If the travel condition of the hybrid vehicle corresponds to the stepless speed-change mode selecting area (the step S111: YES), the ECU 100 transfers the processing to the step S105 and performs the aforementioned process in the step S105. In this case, with or without the clutch release preparing process performed, the normal speed-change mode changing is performed on the basis of the travel condition of the hybrid vehicle 10.

If the travel condition of the hybrid vehicle does not correspond to the stepless speed-change mode selecting area (the step S111: NO), the ECU 100 judges whether or not the clutch mechanism 350 is in a state after the clutch release preparing process, i.e. a release preparing state (step S112). If the clutch mechanism 350 is not in the release preparing state (the step S112: NO), i.e. if the fixed speed-change mode is simply continued, the processing is returned to the step S109, and the travel control by the fixed speed-change mode is continued. Incidentally, in this case, the fixed speed-change mode is continued, and the aforementioned clutch engaging process and the aforementioned reaction element changing process are not performed (which are already performed) in the process in the step S109.

On the other hand, if the process in the step 103 is performed and if the clutch mechanism 350 is in the release preparing state (the step S112: YES), the ECU 100 judges whether or not an elapsed time Tpass from the clutch release preparing process exceeds a reference value Tpassth (i.e. one example of the "predetermined standby time" of the present invention) (step S113).

Here, the reference value Tpassth is set not to make the excessive processing load of the ECC 100 and not to actualize the durability of the power dividing mechanism 300, on an experimental, experiential, theoretical, or simulation basis or the like in advance.

If the elapsed time Tpass exceeds the reference value Tpassth (the step S113: YES), the ECU 100 judges whether or not an accelerator on operation is performed on the basis of a detection signal of the accelerator opening degree sensor 13 (step S114). The accelerator on operation indicates the state that the accelerator opening degree acc is not zero and that the aforementioned deviation "acc(i)–acc(i–1)" between the newest value of the accelerator opening degree acc, acc (i), and the value one sample before, acc(i–1), has a value of zero or more.

If the accelerator on operation is performed (the step S114: YES), the ECU 100 returns the processing to the step S109 and performs the travel control by the fixed speed-change mode. Incidentally, in the process in the step S109, as described above, the clutch engaging process and the reaction element changing process are performed, as occasion demands. In the process in the step S109 performed after the step S114, the reaction element is changed to the sun gear 331, so in this case, the reaction element changing process is performed. In other words, the output torque Trmg1 of the motor generator MG1 is gradually reduced, and the reaction torque is gradually changed from the sun gear 331 to the sun gear 341. If accelerator on operation is not performed (the step S114: NO) or if the elapsed time Tpass is less than or equal to the reference value Tpassth (the step S103: NO), the processing is returned to the step S110, and the series of processes is repeated.

Now, with reference to FIG. 6, the effect of the speed-change control in the embodiment will be explained. FIG. 6 are nomograms of the power dividing mechanism 300 in a procedure of performing the clutch release preparing process.

Incidentally, in FIG. 6, the repeated points of FIG. 4 carry the same reference numerals, and the explanation thereof will be omitted as occasion demands.

Figure 6A:
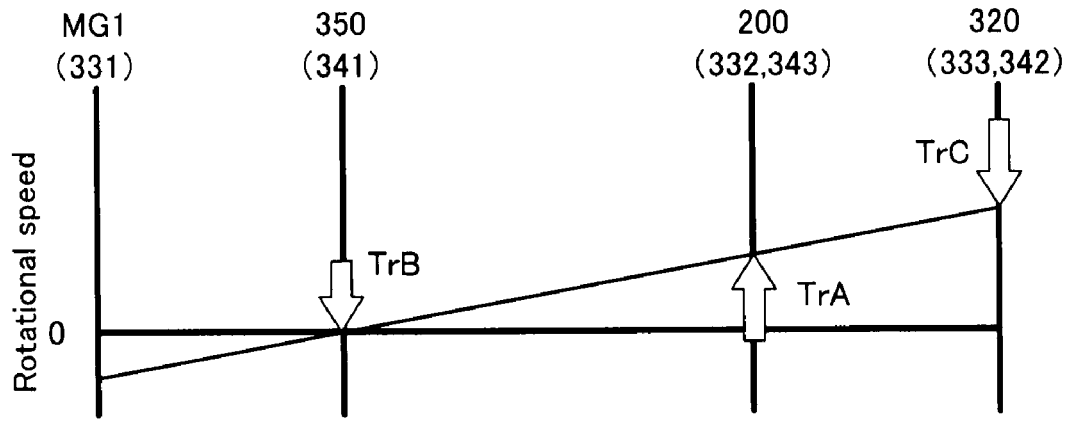
FIG. 6 are nomograms of the power dividing mechanism in a procedure of performing the speed-change control in FIG. 5.

FIG. 6(a) shows a state (a so-called O/D lock state) corresponding to the fixed speed-change mode (i.e. the overdrive mode). In this state, the sun gear 341 is fixed by the clutch mechanism 350, and the rotational speed thereof is zero. The sun gear 341 also functions as the reaction element, and the reaction torque of the engine torque (TrA illustrated) is borne only by the sun gear 341. The sun gear 341 outputs reaction torque TrB. The reaction torque TrB balances with an external force TrC acting on the driving shaft 320 from the exterior.

Figure 6B:
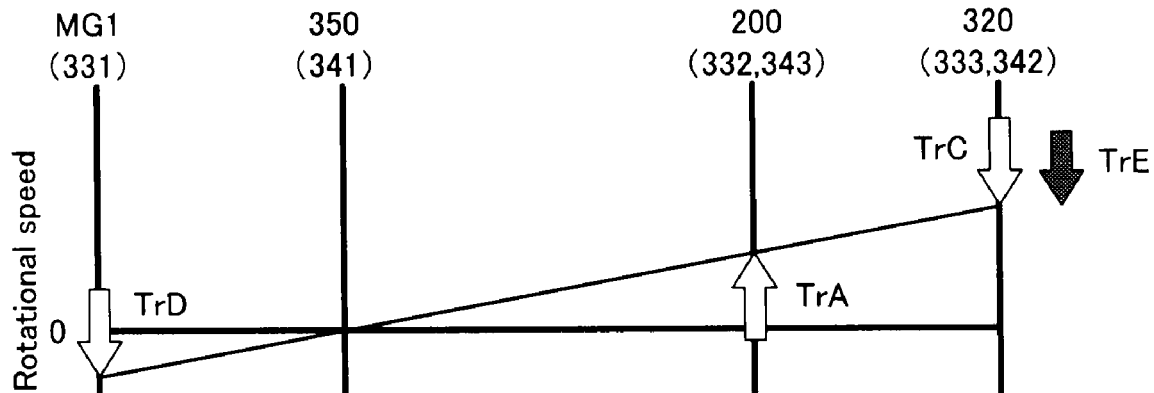

In the state corresponding to the fixed speed-change mode, if the accelerator off operation is performed, the clutch release preparing process is performed, and the reaction element having the reaction torque is changed from the sun gear 341 to the sun gear 331 (FIG. 6(b)). In this state, the combustion rotational speed NE of the engine 200 is unique in accordance with the vehicle speed because the clutch mechanism 350 is still in the engagement state; however, the reaction torque on the sun gear 341 becomes zero, and instead, the sun gear 331 receives the reaction torque, and the motor generator MG1 outputs reaction torque, which is TrD illustrated. In other words, the clutch mechanism 350 can be immediately transferred into the release state.

Incidentally, in this state, the reaction torque of the engine torque acts on the driving shaft 320, and the driving force which appears the driving shaft 320 is increased by that the motor generator MG1 becomes in the power-running state. Thus, torque TrE as a braking force is outputted from the motor generator MG2, so that the electricity to be served to the driving of the motor generator MG1 is provided, and the variation in the driving force is also limited or controlled. The control of the motor generator MG2 described above, however, is less related to the summary of the present invention, so that the description thereof is omitted in the aforementioned speed-change control.

Figure 6C:
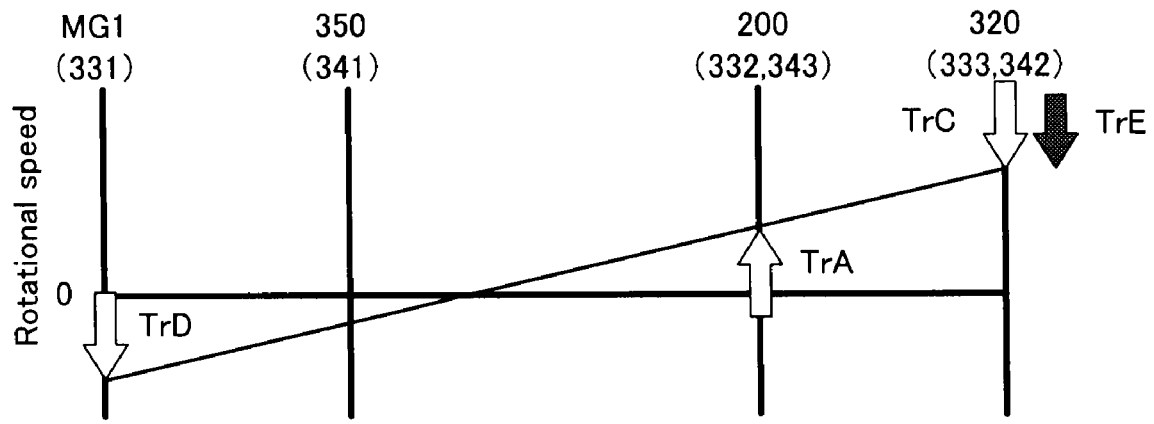

On the other hand, after the state that the accelerator off operation is performed, if the brake pedal operation amount brk exceeds the reference value brkth, the speed-change mode is changed to the stepless speed-change mode (FIG. 6(c)). In other words, in this state, the clutch mechanism 350 is transferred into the release state, and the combustion rotational speed NE of the engine 200 is continuously changed by means of the rotational speed control of the motor generator MG1.

Here, in the case where the speed-change control in the embodiment is not performed, in order to change the speed-change mode from the fixed speed-change mode to the stepless speed-change mode, it is necessary to sequentially follow the processes in FIG. 6(a), FIG. 6(b), and FIG. 6(c) from a time point of a change request. Under such circumstances, if the vehicle speed is rapidly reduced by a sudden braking operation being performed or the like, and if the vehicle speed falls below the vehicle speed which defines a condition of changing the speed-change mode to be less than the vehicle speed corresponding to the self-sustaining rotational speed of the engine 200, the vehicle speed is excessively reduced before reaching to the state of FIG. 6(c) (i.e. before the clutch mechanism 350 is transferred into the release state), and the reduction in power performance and comfortable performance is hardly avoided, as described above.

On the other hand, if the speed-change control in the embodiment is performed, the state of the power dividing mechanism 300 is already in the state shown in FIG. 6(b) at the time point of the change request, and the change to the stepless speed-change mode is completed only by transferring the clutch mechanism 350 into the release state. Therefore, between the two cases, there is a significant difference in time required for the speed-change mode to reach to the stepless speed-change mode in response to the change request. In other words, according to the speed-change control in the embodiment, it is possible to quickly change the speed-change mode to the stepless speed-change mode.

Moreover, according to the speed-change control in the embodiment, as described above, the control based on the accelerator off speed Vaccoff and the brake pedal operation amount brk is also performed. If the accelerator off speed Vaccoff exceeds the reference value Vaccoffth or if the brake pedal operation amount brk exceeds the reference value brkth, there is a high possibility that the significant braking force suddenly acts on the hybrid vehicle 10; however, in a strict sense, at the time point that the accelerator off speed and the brake pedal operation amount indicate this type of value, the reduction in the vehicle speed has not started yet, and consequently, the change request for the speed-change mode has not been generated. In the embodiment, at such a time point, the speed-change mode is changed to the stepless speed-change mode, predictively and unconditionally, and the power dividing mechanism 300 is transferred into the state illustrated in FIG. 6(c). Therefore, even if the sudden reduction in the vehicle speed occurs, which will happen soon in terms of time, that has no effect on the combustion rotational speed NE of the engine 200, and the travel state of the vehicle is controlled without any problem.

As described above, according to the speed-change control in the embodiment, it is possible to avoid that the change from the fixed speed-change mode to the stepless speed-change mode is not in time, so that it is possible to avoid the reduction in power performance and comfortable performance.

Incidentally, the power dividing mechanism 300 in the embodiment is provided with the clutch mechanism 300 of the engagement type, which requires the rotational synchronization and the phase synchronization in the engagement, as one example of the "engaging device" of the present invention; however, the construction that the "engaging device" of the present invention can adopt is not limited to this, and it may be a hydraulically-controlled friction engaging apparatus, such as a wet multiplate clutch (brake). In this case, with the transfer of the reaction torque to the sun gear 341 by the control of the output torque of the motor generator MG1 in the procedure of performing the clutch release preparing process, engagement torque between the engagement elements of the friction engaging apparatus is preferably gradually reduced through the control of a hydraulic driving apparatus or the like. In the clutch mechanism 300, such gradual reduction is automatically realized as so-called mechanical action along with the gradual increase in the output torque of the MG1, so that an engagement force (or engagement torque) cannot be actively controlled.

Here, in this type of friction engaging apparatus, the engagement torque or torque capacity between the engagement elements can be controlled regardless of the output torque of the motor generator MG1. Thus, for example, in a more urgent situation, it is also possible to control the friction engaging apparatus to be in the release state at the time that the transfer of the reaction to the sun gear 331 is not completed. In this case, the output torque of the driving shaft 320 varies even temporarily; however, it is ignorable, compared to the reduction in power performance and comfortable performance caused when the vehicle speed is excessively reduced in the fixed speed-change mode in which the input shaft 310 is mechanically connected, and it is more effective as attention to safety.

Second Embodiment

Figure 7:
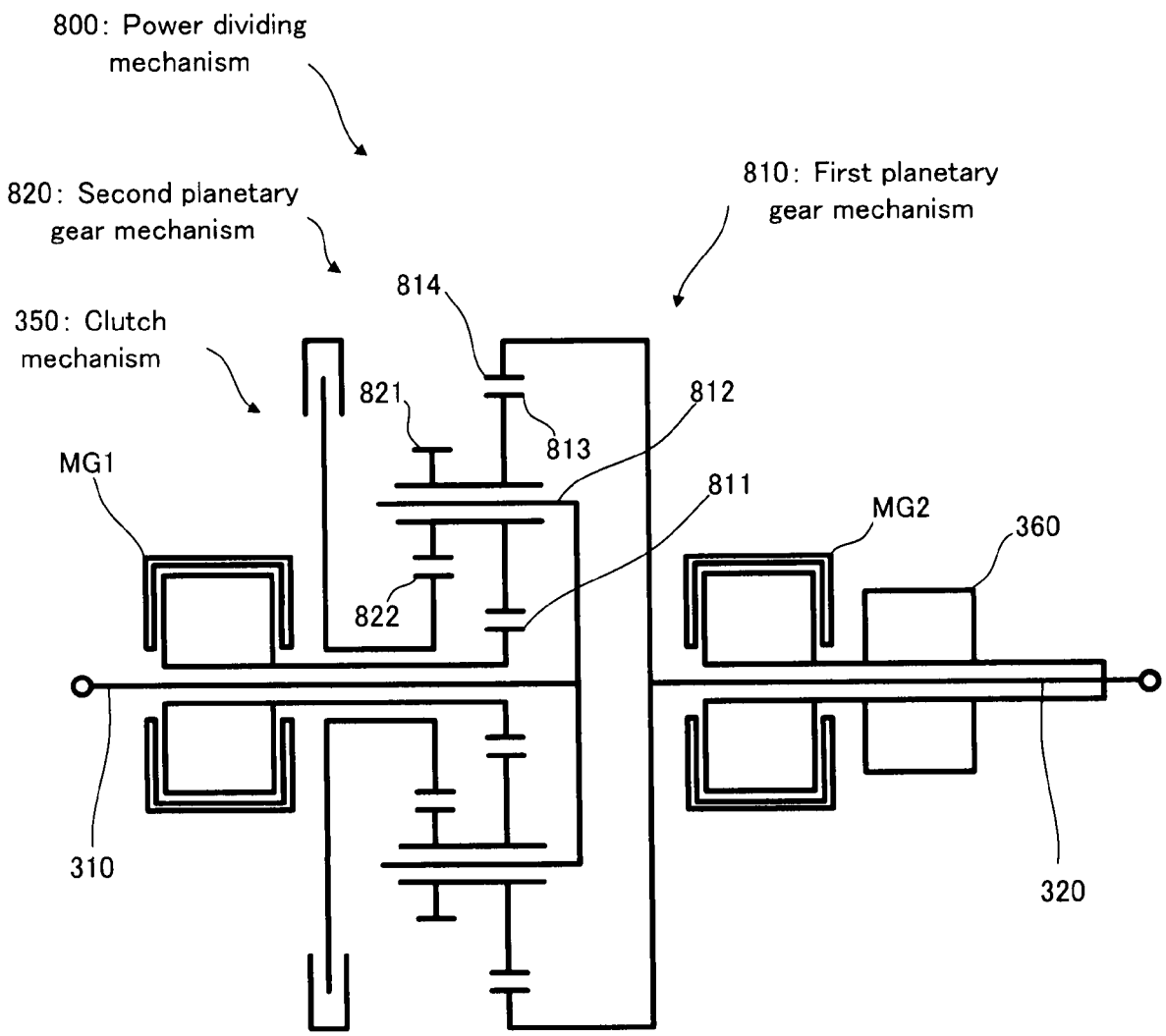
FIG. 7 is a schematic configuration diagram conceptually showing one example of the power dividing mechanism in a second embodiment of the present invention.
Figure 8:
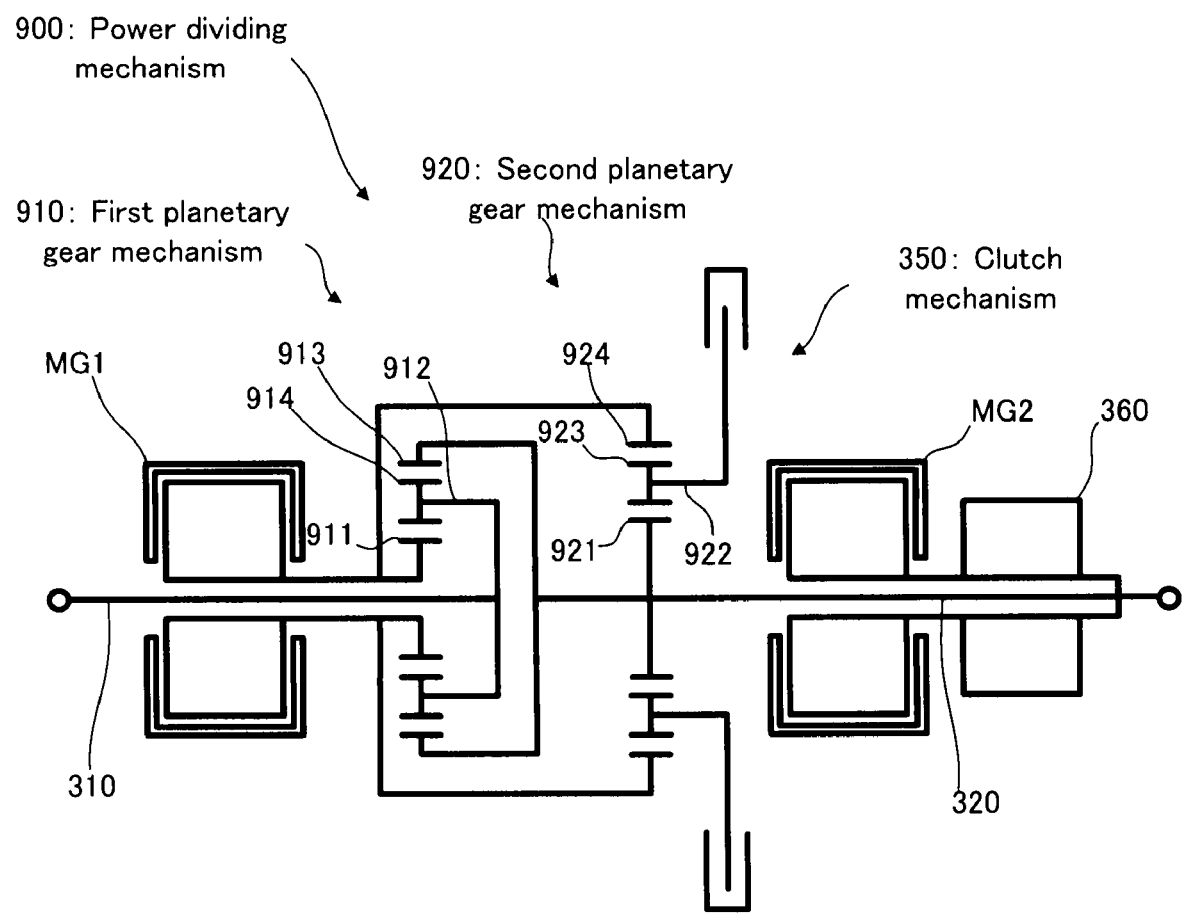
FIG. 8 is a schematic configuration diagram conceptually showing another example of the power dividing mechanism in the second embodiment of the present invention.

As one example of the "power dividing device" of the present invention, the first embodiment illustrates the power dividing mechanism 300 obtained by combining the single pinion type planetary gear mechanism and the double pinion type planetary gear mechanism; however, the construction that the power dividing device of the present invention can adopt is not limited to the power dividing mechanism 300 as long as it can realize at least the stepless speed-change mode and the fixed speed-change mode. Now, with reference to FIG. 7 and FIG. 8, other construction examples of the power dividing device will be explained as a second embodiment of the present invention. FIG. 7 is a schematic configuration diagram conceptually showing the structure of a power dividing mechanism 800. FIG. 8 is a schematic configuration diagram conceptually showing the structure of a power dividing mechanism 900. Incidentally, in FIG. 7 and FIG. 8, the repeated points of FIG. 3 carry the same reference numerals, and the explanation thereof will be omitted as occasion demands.

In FIG. 7, in the power dividing mechanism 800, the input shaft 310 connected to the crankshaft 205 of the engine 200 is connected to a carrier 812. The motor generator MG1 is connected to a sun gear 811, and a ring gear 814 as an internal gear, placed concentrically to the sun gear 811, is connected to the driving shaft 320. A large pinion gear 813 which engages with the sun gear 811 and the ring gear 814 is held by the carrier 812 so as to rotate around its central axis and to revolve because of the rotation of the carrier 812. The carrier 812, the sun gear 811, the ring gear 814, and the large pinion gear 813 constitute a first planetary gear mechanism 810.

On the other hand, the large pinion gear 813 is constructed as a so-called stepped pinion gear; namely, a small pinion gear 821 with a smaller diameter than that of the large pinion gear 813 is arranged in the same axis and integrated with the large pinion gear 813. The small pinion gear 821 engages with a sun gear 822 with a larger diameter than that of the sun gear 811. In other words, the sun gear 822, the large pinion gear 813 and the small pinion gear 821 (i.e. the stepped pinion gear), and the carrier 812 for holding the pinion gear, and the aforementioned ring gear 814 constitutes a second planetary gear mechanism 820. As described above, the power dividing mechanism 800 is provided with the two pairs of planetary gear mechanisms, which share the carrier and the ring gear by integrally connecting the pinion gears with different number of teeth.

Therefore, the sun gear 811 in the first planetary gear mechanism 810 has a smaller diameter than that of the sun gear 822 in the second planetary gear mechanism 820, and the ring gear 814 is shared, so that the gear ratio of the first planetary gear mechanism 810 (or a ratio of the number of teeth between sun gear and the ring gear) is less than the gear ratio of the second planetary gear mechanism 820. Here, the aforementioned clutch mechanism 350 is connected to the sun gear 822, wherein the clutch mechanism 350 selectively stops the rotation of the sun gear 822. If the clutch mechanism 350 is in the engagement state, the sun gear 822 is physically fixed, so that the speed-change ratio of the power dividing mechanism 300 becomes the overdrive speed-change ratio.

In FIG. 8, the power dividing mechanism 900 is provided with a first planetary gear mechanism 910 and a second planetary gear mechanism 920. The input shaft 310 for transmitting the engine torque is connected to a carrier 912 of the first planetary gear mechanism 910. The motor generator MG1 is connected to a sun gear 911 of the first planetary gear mechanism 910, and a ring gear 913 as an internal gear, placed concentrically to the sun gear 911, is connected to the driving shaft 320. A pinion gear 914 which engages with the sun gear 911 and the ring gear 913 is held by the carrier 912 so as to rotate around its central axis and to revolve because of the rotation of the carrier 912.

The second planetary gear mechanism 920 is arranged on the same axis as that of the first planetary gear mechanism 910. The driving shaft 320 passes through the central portion of a sun gear 921, and the sun gear 921 is connected to the driving shaft 320. In other words, the sun gear 921 is connected to the ring gear 913 of the first planetary gear mechanism 910 to integrally rotate. Moreover, a ring gear 924 placed concentrically to the sun gear 921 is connected to the sun gear 911 of the first planetary gear mechanism 910. In other words, the ring gear 924 of the second planetary gear mechanism 920 is connected to the motor generator MG1.

Moreover, a pinion gear 923 which is located between and engages with the sun gear 921 and the ring gear 924 is held by the carrier 922 so as to rotate and revolve. The clutch mechanism 350 is placed so as to selectively fix the carrier 922. As described above, the power dividing mechanism 900 is provided with the two pairs of single pinion type planetary gear mechanisms. Even in such construction, it is possible to preferably realize the stepless speed-change mode and the fixed speed-change mode by controlling the clutch mechanism 350 to be in the engagement state.

The present invention is not limited to the embodiments described above. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Application No. 2007-333103 filed on Dec. 25, 2007 including the specification, claims, drawings and summary are incorporated herein by reference in their entireties.

What is claimed is:

1. A control apparatus for a hybrid driving apparatus installed in a vehicle, said control apparatus comprising:
   an internal combustion engine;
   a first electric motor;
   an engaging device comprising first and second engagement elements which can engage with each other;
   a power dividing device comprising a plurality of rotational elements including a first rotational element connected to an output shaft of said internal combustion engine, a second rotational element connected to an output shaft of said first electric motor, a third rotational element connected to a driving shaft of the vehicle, and a fourth rotational element connected to the first engagement element, the rotational elements being adapted to mutually perform differential rotation; and
   a second electric motor whose output shaft is connected to the third rotational element,
   wherein said first electric motor is capable of controlling rotational speeds of the first and fourth rotational elements,
   wherein a stepless speed-change mode, which can continuously change a rotational speed ratio between the driving shaft and the output shaft of said internal combustion engine, is realized, as a speed-change mode of the vehicle by that the second rotational element has reaction torque of output torque of said internal combustion engine if said engaging device is in a release state in which the first engagement element is released from the second engagement element, wherein a fixed speed-change mode, which fixes the rotational speed ratio to a predetermined value, is realized, as the speed-change mode, by that the fourth rotational element has the reaction torque if said engaging device is in an engagement state in which the first engagement element engages with the second engagement element, wherein said control apparatus further includes
- a specifying device that specifies an extent of a predetermined type of decelerating operation which indicates that the vehicle is decelerated and which includes at least a releasing operation amount related to an accelerator pedal releasing operation and a pressing operation amount related to a brake pedal pressing operation; and
- a controlling device that performs a predetermined release preparing control which includes controlling said first electric motor such that the specified extent corresponds to a magnitude of the reaction torque applied to the second rotational element, if the fixed speed-change mode is chosen as the speed-change mode and the specified releasing operation amount is greater than or equal to a first reference value, and wherein the controlling device controls said engaging device such that said engaging device is in the release state after the release preparing control is performed if the fixed speed-change mode is chosen as the speed-change mode and the specified pressing operation amount is greater than or equal to a third reference value.

2. The control apparatus for the hybrid driving apparatus according to claim 1, wherein
said specifying device specifies a releasing operation speed related to an accelerator pedal releasing operation as the extent of the decelerating operation, and
said controlling device controls said engaging device such that said engaging device is in the release state after the release preparing control is performed if the specified releasing operation speed is greater than or equal to a second reference value.

3. The control apparatus for the hybrid driving apparatus according to claim 1, wherein said controlling device controls said first electric motor such that the reaction torque applied to the second rotational element does not become zero in at least a predetermined standby time if the release preparing control is performed.

4. The control apparatus for the hybrid driving apparatus according to claim 1, wherein
said engaging device performs engagement by a frictional force acting between the first and second engagement elements, and
said controlling device controls said engaging device such that a specified large extent and a specified small extent correspond to a small and a large magnitude of the frictional force, respectively.

5. The control apparatus for the hybrid driving apparatus according to claim 2, wherein said controlling device controls said first electric motor such that the reaction torque applied to the second rotational element does not become zero in at least a predetermined standby time if the release preparing control is performed.

6. The control apparatus for the hybrid driving apparatus according to claim 5, wherein
said engaging device performs engagement by a frictional force acting between the first and second engagement elements, and
said controlling device controls said engaging device such that a specified large extent and a specified small extent correspond to a small and a large magnitude of the frictional force, respectively.

* * * * *